US009087296B2

(12) United States Patent
Sakunkoo et al.

(10) Patent No.: US 9,087,296 B2
(45) Date of Patent: Jul. 21, 2015

(54) NAVIGABLE SEMANTIC NETWORK THAT PROCESSES A SPECIFICATION TO AND USES A SET OF DECLARITIVE STATEMENTS TO PRODUCE A SEMANTIC NETWORK MODEL

(75) Inventors: Nathan Sakunkoo, Stanford, CA (US); Walter Chang, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2191 days.

(21) Appl. No.: 12/035,629

(22) Filed: Feb. 22, 2008

(65) Prior Publication Data

US 2014/0304214 A1    Oct. 9, 2014

(51) Int. Cl.
*G06F 15/18* (2006.01)
*G06N 5/02* (2006.01)
*G06F 17/30* (2006.01)

(52) U.S. Cl.
CPC .......... *G06N 5/022* (2013.01); *G06F 17/30734* (2013.01)

(58) Field of Classification Search
USPC .......................................... 706/12, 45–48, 62
See application file for complete search history.

(56) References Cited

U.S. PATENT DOCUMENTS

| 5,021,976 | A  | 6/1991  | Wexelblat et al.  |
| 5,295,243 | A  | 3/1994  | Robertson et al.  |
| 5,619,632 | A  | 4/1997  | Lamping et al.    |
| 5,870,559 | A  | 2/1999  | Leshem et al.     |
| 6,031,537 | A  | 2/2000  | Hugh              |
| 6,166,739 | A  | 12/2000 | Hugh              |
| 6,216,134 | B1 | 4/2001  | Heckerman et al.  |
| 6,219,053 | B1 | 4/2001  | Tachibana et al.  |
| 6,356,285 | B1 | 3/2002  | Burkwald et al.   |
| 6,369,819 | B1 | 4/2002  | Pitkow et al.     |
| 6,377,287 | B1 | 4/2002  | Hao et al.        |
| 6,556,983 | B1 | 4/2003  | Altschuler et al. |
| 6,888,554 | B1 | 5/2005  | Decombe           |
| 6,918,096 | B2 | 7/2005  | Hugh              |

(Continued)

OTHER PUBLICATIONS

Introducing Visual Thesaurus Wordlists, http://replay.waybackmachine.org/20001101212/http://visualthesaurus.com/cm/an; retrieved Mar. 9, 2011, pp. 1.*

(Continued)

*Primary Examiner* — David Vincent
(74) *Attorney, Agent, or Firm* — Kilpatrick Townsend & Stockton LLP

(57) ABSTRACT

A computer environment includes an editor application enabling generation of a specification (e.g. a graphic description) defining attributes of a navigable semantic network. An example navigable semantic network as defined by the specification can include multiple resource nodes and corresponding links defining relationships amongst the resource nodes. In addition to defining nodes and relationships, the specification can define display rules, navigation rules, etc. associated with the navigable semantic network. The computer environment can further include a compiler, a view instantiation engine, and a presentation engine. The compiler compiles the specification into a semantic network model. The view instantiation engine instantiates different portions of a semantic network as defined by the semantic network model. The presentation engine initiates display of the instantiated portion of the semantic network. Based on navigation input, the view instantiation engine updates an instantiated portion of the semantic network for presentation by the presentation engine.

27 Claims, 16 Drawing Sheets

(56) References Cited

U.S. PATENT DOCUMENTS

| | | |
|---|---|---|
| 6,931,604 B2 | 8/2005 | Lane |
| 7,143,392 B2 | 11/2006 | Li et al. |
| 7,224,362 B2 | 5/2007 | Kincaid et al. |
| 7,392,482 B2 | 6/2008 | Firebaugh et al. |
| 7,549,309 B2 | 6/2009 | Beringer et al. |
| 7,672,950 B2 | 3/2010 | Eckardt, III et al. |
| 7,720,857 B2 | 5/2010 | Beringer et al. |
| 7,761,549 B2 | 7/2010 | Farnham et al. |
| 2002/0055919 A1 | 5/2002 | Mikheev |
| 2002/0133392 A1 | 9/2002 | Angel et al. |
| 2003/0167324 A1 | 9/2003 | Farnham et al. |
| 2004/0030692 A1* | 2/2004 | Leitermann ............... 707/4 |
| 2004/0030741 A1* | 2/2004 | Wolton et al. ............. 709/202 |
| 2006/0212490 A1 | 9/2006 | Takahashi et al. |
| 2007/0022000 A1 | 1/2007 | Bodart et al. |
| 2007/0156677 A1* | 7/2007 | Szabo ....................... 707/5 |
| 2008/0104225 A1 | 5/2008 | Zhang et al. |
| 2008/0319947 A1* | 12/2008 | Latzina et al. ............. 707/3 |
| 2009/0024747 A1 | 1/2009 | Moses et al. |

OTHER PUBLICATIONS

Introducing Visual Thesaurus Wordlists, http://replay.waybackmachine.org/20070221200601/http://www.visualthesaurus.com, retrieved Mar. 9, 2011, pp. 1-2.*

Mizoguchi, Ontology development, tools, and languages, 2004, Springer, New Generation Computing, pp. 1-27.*

Office Action dated May 11, 2011 in U.S. Appl. No. 12/035,617.

* cited by examiner

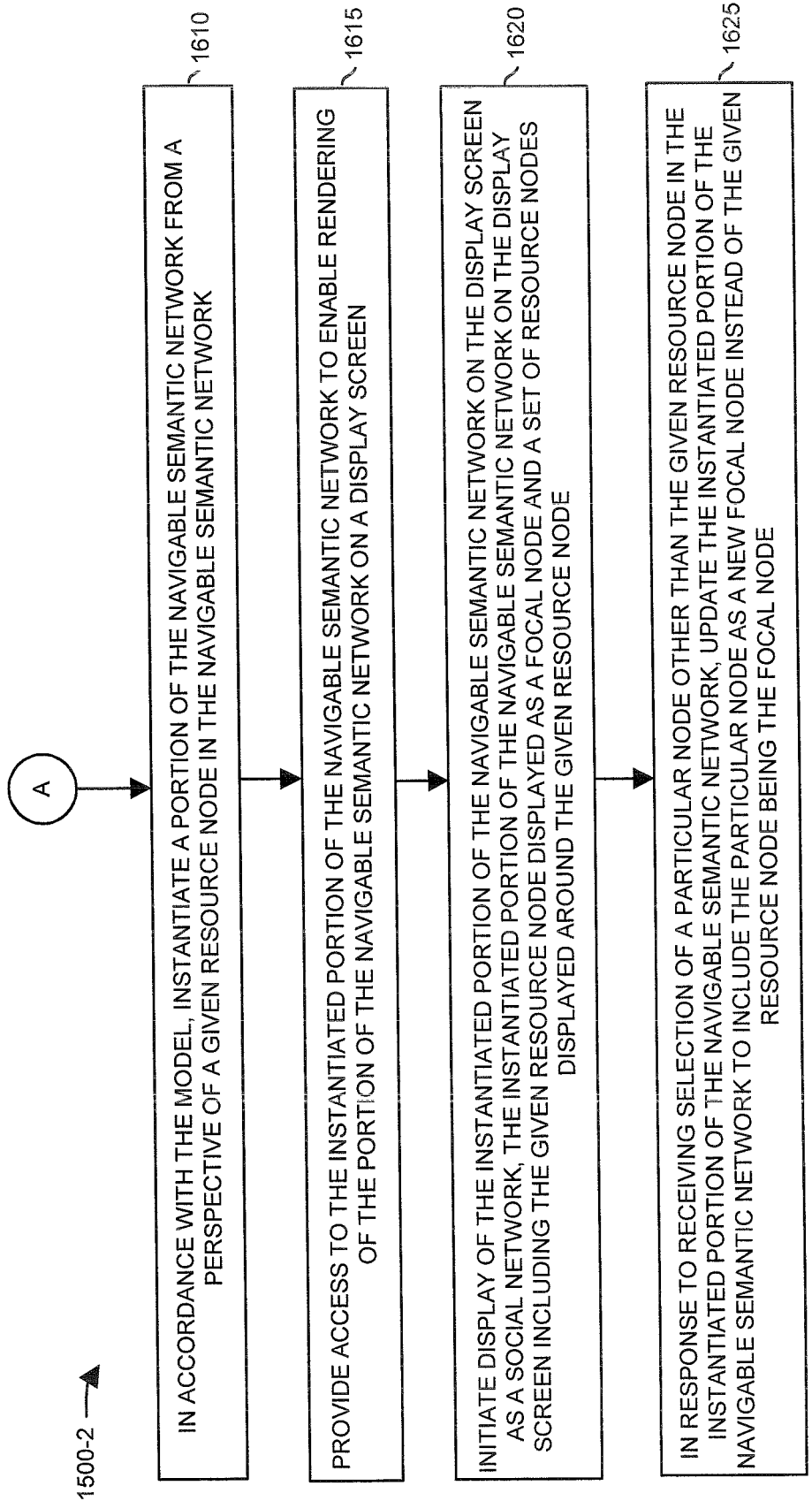

NAVIGABLE SEMANTIC NETWORK THAT PROCESSES A SPECIFICATION TO AND USES A SET OF DECLARITIVE STATEMENTS TO PRODUCE A SEMANTIC NETWORK MODEL

RELATED APPLICATIONS

This application is related to U.S. patent application entitled "NETWORK VISUALIZATION AND NAVIGATION," U.S. Pat. No. 8,332,782, filed on the same day as the present application, the entire teachings of which are incorporated herein by this reference.

BACKGROUND

In general, semantic networks provide a way to convey relationships between different entities. For example, a semantic network can include a number of resource nodes. Links between the resource nodes in a semantic network typically indicate a relationship from one resource to another.

If presented properly, a semantic network can be very useful for identifying relationships between the same or different types of resources. For example, a node of a semantic network can represent a core idea. The core idea may not be adequately described via use of a mere label specifying the core idea. Use of a semantic network enables one to easily display additional information associated with the core idea. As an example, information associated with a core idea node can be represented as additional nodes in the semantic network. Such additional nodes can represent information such as documents, text, pictures, links to websites, etc. associated with the core idea.

A presence of links between the core idea node and other nodes enables a viewer to quickly identify a degree to which the additional nodes are related to the core idea. For example, a direct link between a satellite node and a core node can indicate that the satellite node is closely related to the core idea. Nodes that are present in the semantic network but that are not directly connected to the core idea node can represent more tangential concepts.

SUMMARY

Conventional methods of representing and displaying semantic networks suffer from a variety of deficiencies. For example, conventional semantic networks can be very large and include an extraordinary number of resource nodes and corresponding relationships. Thus, if attempted, modeling a semantic network using a low level programming language can be a very tedious task. Even if one is able to overcome the hurdle of creating a model for a complex semantic network, rendering views (or creating code to render views) associated with such networks can be difficult as well.

Techniques discussed herein significantly overcome the deficiencies of building complex semantic network applications compared to conventional approaches. For example, as will be discussed further, certain specific embodiments herein are directed to a computer environment including an editor application. The editor application enables generation of a specification (e.g. a graphic description of text, tags, etc.) defining attributes of a navigable semantic network. An example navigable semantic network model as defined by the specification can include multiple resource nodes and corresponding links defining relationships amongst the resource nodes. In addition to defining nodes and relationships, the specification can include display rules and navigation rules associated with the navigable semantic network.

More specifically, in one embodiment, an editor application receives input data (e.g., from a developer) including a set of declaritive statements defining parameters of a semantic network model. The editor application (via input from a developer) populates a specification with the set of declaritive statements to define the semantic network model. In one embodiment, the declarative statements are non-procedural statements such as those associated with a high level programming language such as a markup language. The editor application maintains (e.g., stores) the specification in a repository.

Creation of a semantic network specification via use of declarative statements as described herein enables a developer to more easily and more efficiently define corresponding attributes of a semantic network and semantic network model. As will be discussed, the semantic network model derived from the specification can be a data structure of node information (e.g., executable node information) accessed by a view instantiation engine that renders different views based on information contained in the semantic network model. In one embodiment, each node in the semantic network model can include node information as derived from the specification of declarative statements. Each of the nodes in the semantic network model can be displayed on a respective display screen in accordance with input of a user or other source.

As an example, certain declarative statements in the semantic network specification can identify one or more locations where data associated with the navigable semantic network is stored in one or more accessible repositories. The data in the one or more repositories can include label information, relationship information, etc. associated with nodes of the semantic network model. Such data enables a view instantiation engine to access the appropriate data from the one or more repositories and subsequently instantiate, as specified by the semantic network model, a navigable view (e.g., portion) of nodes associated with the semantic network.

Other declarative statements in the semantic network specification can specify display rules associated with the semantic network. As their name suggests, the display rules can define how to display different resource nodes and relationships amongst the different resource nodes in the navigable semantic network.

In addition to defining a location of stored data, yet other declarative statements in the specification can identify: i) different navigation input commands that can be applied to respective resources (e.g., nodes, links, etc.) of the semantic network to navigate about different views of the semantic network, and ii) different actions to be taken in response to receiving the navigation input commands.

In one embodiment, the semantic network specification can be populated with declarative statements in accordance with a markup language. The markup language can include sets of tags for delineating segments of the specification in which to define attributes or parameters associated with the semantic network model. Thus, during development of the specification, a developer can more easily and efficiently define a navigable semantic network and its corresponding attributes.

In addition to the editor application used to generate the specification as discussed above, embodiments herein can include a compiler, a view instantiation engine, and/or a presentation engine.

In an example embodiment, the compiler compiles the specification into an executable semantic network model. The semantic network model can be configured to include node information for each of the multiple nodes in the semantic network as specified by the specification.

In general, the view instantiation engine instantiates different portions (e.g., views) of a network of elements (e.g., nodes) as defined by the semantic network model. The presentation engine initiates display of the instantiated portion of the semantic network. These and other related functions will be discussed in more detail later in this specification.

Note that each of the embodiments herein can include a configuration of one or more computerized devices, websites, hosted services, workstations, handheld or laptop computers, or the like to carry out and/or support any or all of the method operations disclosed herein. In other words, one or more computerized devices or processors can be programmed and/or configured to include an editor application, compiler, view instantiation engine, presentation engine, and/or related functions as explained herein to carry out different embodiments of the invention.

Yet other embodiments herein include software programs to perform the steps and operations summarized above and disclosed in detail below. One such embodiment comprises a computer program product that has a computer-readable medium (e.g., a tangible computer readable media) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer readable medium having instructions stored thereon for supporting operations such as generation of a semantic network specification using declarative statements or a non-procedural language. The instructions, and thus method as described herein, when carried out by a processor of a respective computer device, cause the processor to: i) receive input data including a set of declarative statements defining parameters of a semantic network model; ii) populate a specification with the set of declarative statements to define the semantic network model; and iii) maintain the specification in a repository.

Another particular embodiment of the present disclosure is directed to a computer program product that includes a computer readable medium having instructions stored thereon for supporting operations such as compilation of the specification including declarative statements. Such instructions, and thus method as described herein, when carried out by a processor of a respective computer device, cause the processor to: i) receive a specification defining attributes of a navigable semantic network; ii) process the specification to identify a set of declarative statements; and iii) utilize the set of declarative statements identified by the specification to produce a semantic network model associated with the navigable semantic network, the semantic network model enabling instantiation of different portions of the navigable semantic network for viewing based on navigation input.

Yet another particular embodiment of the present disclosure is directed to a computer program product that includes a computer readable medium having instructions stored thereon for supporting operations such as instantiation of different views associated with a navigable semantic network. Such instructions, and thus method as described herein, when carried out by a processor of a respective computer device, cause the processor to: i) access a model of a navigable semantic network, the model defining resource nodes and relationships amongst the resource nodes in the navigable semantic network; ii) in accordance with the model, instantiate a portion of the navigable semantic network from a perspective of a given resource node in the navigable semantic network; and iii) provide access to the instantiated portion of the navigable semantic network to enable rendering of the portion of the navigable semantic network on a display screen.

The numbering of the previous steps has been added for clarity sake, these steps may not need to be performed in any particular order.

Other embodiments of the present disclosure include software programs to perform any of the method embodiment steps and operations summarized above and disclosed in detail below.

Also, it is to be understood that each of the systems, methods, and apparatuses herein can be embodied strictly as a software program, as a hybrid of software and hardware, or as hardware alone such as within a processor, or within an operating system or within a software application. Example embodiments of the invention may be implemented in products and/or software applications such as those manufactured by Adobe Systems Incorporated of San Jose, Calif., USA.

As discussed above, techniques herein are well suited for use in software applications supporting modeling and use of semantic networks. However, it should be noted that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this summary section herein does not specify every embodiment and/or incrementally novel aspect of the present disclosure or claimed invention. Instead, this summary only provides a preliminary discussion (e.g., an overview) of different embodiments and corresponding points of novelty over conventional techniques. For additional details and/or possible perspectives (permutations) of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIGS. 15 and 16 combine to form a flowchart illustrating an example method for generating and using a semantic network model according to embodiments herein.

DETAILED DESCRIPTION

According to one embodiment, a computer environment includes an editor application enabling generation of a specification (e.g. a graphic description) defining attributes of a navigable semantic network. An example navigable semantic network as defined by the specification can include multiple resource nodes and corresponding links defining relationships amongst the resource nodes. In addition to defining nodes and relationships, the specification can define display rules, navigation rules, etc. associated with the navigable semantic network.

The computer environment can further include a compiler, a view instantiation engine, and a presentation engine. The compiler compiles the specification into a semantic network model. Each node in the semantic network model includes node information specifying: i) a location where data associated with a respective node can be found in a remote storage location, ii) display rule information indicating how to display the respective node when so rendered in a graphical user interface, and iii) relationship information indicating neighboring nodes related to the respective node, and iv) different input (e.g., navigation commands) that can be applied to the respective node.

The view instantiation engine instantiates different portions of a semantic network as defined by the semantic network model. The presentation engine initiates display of the instantiated portion (e.g., a derived bitmap for displaying a view) of the semantic network. Based on navigation input, the view instantiation engine updates an instantiated portion of the semantic network for presentation by the presentation engine.

Figure 1:
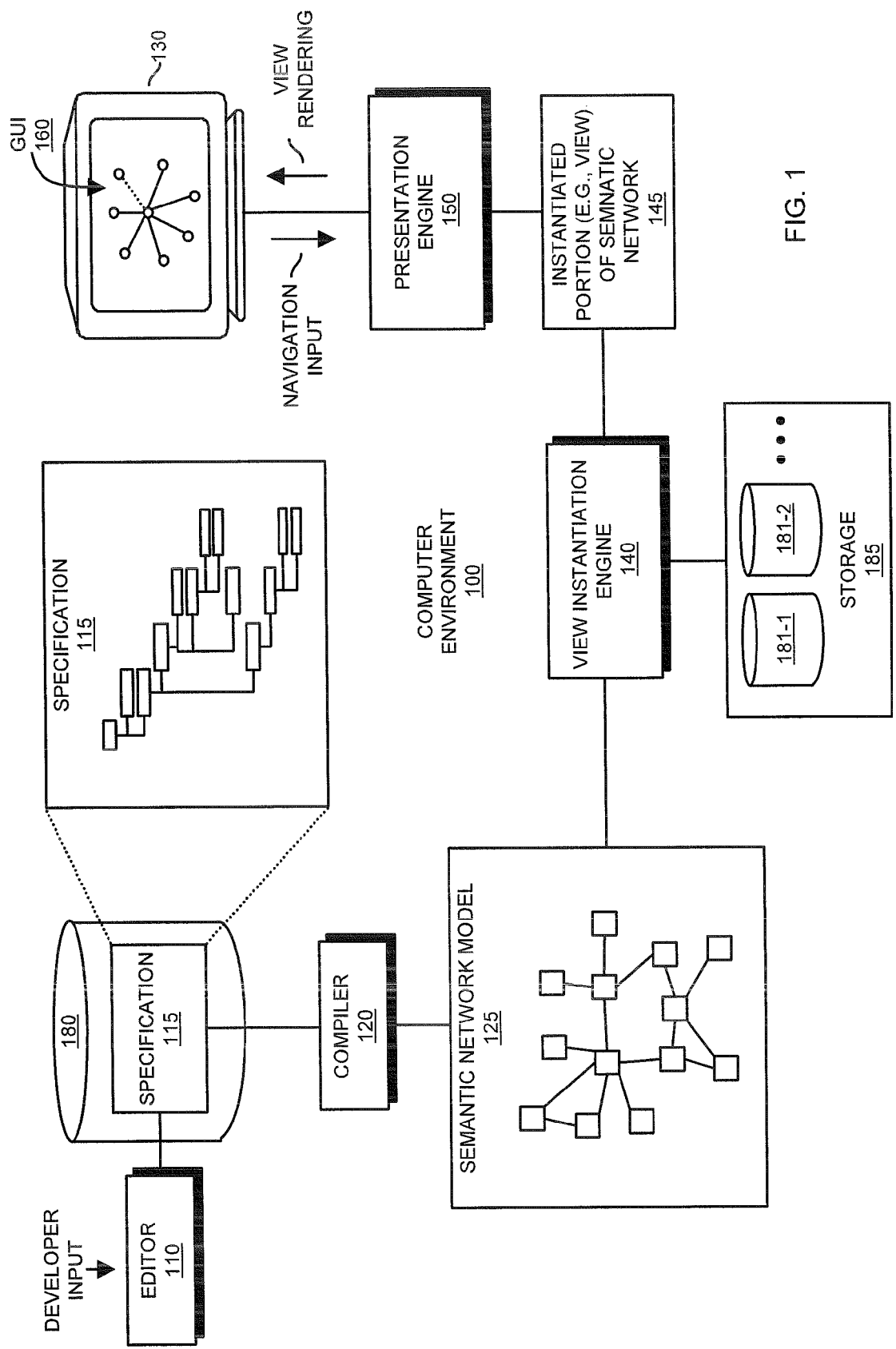
FIG. 1 is an example block diagram of a computer environment supporting a navigable semantic network and related functions according to embodiments herein.

More specifically, FIG. 1 is an example block diagram of a computer environment 100 according to embodiments herein. As shown, computer environment 100 includes editor application 110, repository 180, compiler 120, semantic network model 125, view instantiation engine 140, storage 185, instantiated portion of semantic network 145, presentation engine 150, and display screen 130. Repository 180 stores specification 115. Storage 185 (e.g., federated databases) includes repository 181-1, repository 181-2, etc.

Editor application 110 (e.g., a text editor, image editor, windows application, etc.) enables a developer to generate a specification 115 describing attributes of a navigable semantic network. An example navigable semantic network, as defined by the specification 115, can include multiple resource nodes and corresponding links defining relationships amongst the resource nodes. The semantic network can include an interconnection of multiple different types of network information.

In addition to defining nodes and relationships, the specification 115 can define (based on input from a developer) display rules, navigation rules, etc. associated with the navigable semantic network. This will be discussed later in this specification.

In accordance with an example embodiment, the editor application 110 receives input. The input can be received based on a developer typing in data via a keyboard, selecting options from a computer mouse, etc. The input can include a set of declarative statements defining parameters of semantic network model 125. Based on such input (e.g., declarations, non-procedural statements, declarative statements, etc. such as those associated with a high level programming language), the editor application 110 populates the specification 115 with a graphic description of a corresponding semantic network. In other words, according to one embodiment, the editor application 110 receives input from a developer and populates the specification 115 to include a set of declarative statements (e.g.) to define the semantic network model 125.

The editor application 110 maintains (e.g., stores) the specification 115 in repository 180. Thus, the specification 180 can be easily accessed and modified by any number of sources.

In a further example embodiment, a developer can create the specification 115 by populating the specification 115 with declarative statements in accordance with a markup language. The markup language can include sets of tags for delineating segments of the specification in which to define attributes or parameters associated with the semantic network model.

Use of declarative statements and markup language to produce the specification 115 (as opposed to a low level programming language) enables the developer to more easily and efficiently define the semantic network model 125 (e.g., a navigable semantic network) and its corresponding attributes. For example, a semantic network model can include many nodes and complex relationships. Specifying each by a low level language would be tedious and time consuming. Use of declarative statements simplifies the task of defining the semantic network.

As shown, the computer environment 100 can further include a compiler 120 (e.g., a parser), a view instantiation engine 140, and a presentation engine 150.

The compiler 120 in computer environment 100 compiles the specification 115 to produce semantic network model 125. Compilation of the specification 115 can include converting declarative statements in the specification 115 to a data structure and/or executable code (e.g., semantic network model 125) that lends itself to creation of different views or portions of a corresponding navigable semantic network. The data structure maintains node information such as that shown and discussed with respect to FIG. 5.

Referring again to FIG. 1, the view instantiation engine 140 accesses the semantic network model 125 to instantiate one or more portions (e.g., views) of the semantic network as defined by the semantic network model 125. Input provided by a user viewing graphical user interface 160 indicates which of multiple views of the navigable semantic network the user would like displayed in graphical user interface 160.

As an example, a viewer associated with display screen 130 provides navigation input. In accordance with the navigation input, the view instantiation engine 140 accesses the semantic network model 125 to generate an instantiated portion of semantic network 145. The instantiated portion of semantic network 145 thus includes graphical information enabling the presentation engine 150 to present a corresponding view of the semantic network.

In one embodiment, the navigation input received from a user specifies a given node in the navigable semantic network. The view instantiation engine 140 accesses the semantic network model 125 to identify metadata (e.g., node information) associated with the given node and other related nodes to be displayed. The metadata can include information such as relationship information, data source information, display information, and control information.

Based on the metadata associated with the given node (e.g., selected node or portion of the semantic network for viewing) and related nodes, the view instantiation engine 140 generates instantiated portion of semantic network 145. For example, the view instantiation engine 140 identifies metadata such as relationship information, data source information, display information, and control information associated with the selected node and related node to generate view information for display on display screen 130.

In one embodiment, the view instantiation engine 140 utilizes the relationship information retrieved from semantic network model 125 to identify which other nodes in the semantic network are directly and indirectly related to the selected node.

The view instantiation engine 140 utilizes data source information in the semantic network model 125 to identify which data in storage 185 is associated with the selected node and related nodes. The storage 185 can include one or more databases, file systems, etc. for instantiating a respective view for display on display screen 130.

The view instantiation engine 140 utilizes display information (e.g., display rules in the semantic network model 125) associated with the selected node and related nodes to identify how to render the selected node and related nodes in a corresponding view.

The view instantiation engine 140 utilizes the control information to identify what commands can be applied to the selected node as well as what actions to execution in response to receiving different types of input with respect to the selected node and related nodes.

Thus, based on node information (e.g., relationship information, data source information, display information, and/or control information) in the semantic network model 125, the view instantiation engine 140 instantiates an appropriate view including the selected node and related nodes. In other words, the view instantiation engine 140 generates display information (e.g., instantiated portion of semantic network 145) to enable a display of a portion of the semantic network from a perspective of the selected node. The perspective can include the selected node as a centroid or focal node, around which other related nodes are displayed.

The presentation engine 150, utilizes the instantiated portion of semantic network 145 (e.g., graphical display information) to render the corresponding portion of the semantic network including the selected node.

As will be discussed later in this specification, a viewer can provide further input with respect to the portion of the semantic network viewed on display screen 130. Based on selection of different nodes rendered on display screen 130, the view instantiation engine 140 can repeat the process as discussed above to update the view.

For example, the presentation engine 150 can display a "focal" node (e.g., the selected node) as well as set of nodes related to the selected node. In response to selection of a node other than the focal node by a viewer, the view instantiation engine 140 updates the instantiated portion of semantic network 145 (e.g., view) in accordance with the newly selected node in a manner as discussed above. Accordingly, a user viewing the portion of the semantic network can "walk" through and view different portions of the semantic network merely by clicking on nodes of the semantic network displayed on the display screen 130.

Instantiating only portions (rather than all views) of the navigable semantic network represented by semantic network model 125 may be useful. For example, instantiating only one or more portions (rather than all views) of the navigable semantic network depending on a view selected by a respective user saves on memory resources because the view instantiation engine 140 can overwrite data in memory to create and store a new view (e.g., portion) in lieu of an old view (e.g., portion). Additionally, generating a detailed graphical representation of an entire semantic network (although possible) would likely take a significant amount of time, resulting in a possible initial bottleneck for displaying the views to a respective viewer.

In one embodiment, creating a specification (e.g., an graph description declaration) includes the following steps.

1. Identify the database(s) from which internal nodes and edge node data will be retrieved.
2. Conceptually define objects that will form the graph of nodes (i.e., internal nodes and edge nodes).
3. Identify and specify the node objects:
   a.) Specify the node model—this can include database and any SQL (e.g., Structured Query Language) queries needed to retrieve node data from storage 185.
   b.) Specify node views—this can include all GUI (e.g., graphical user interface) and rendering aspects for a given node whether the given node is viewed as a focal node or non-focal node in a view.
   c.) Specify the node controller—this includes specifying all user actions or commands that can be applied to a respective node, including initiating navigation to another graph (e.g., view). This is how graphs are linked in the system.
4. Identify and specify the edge objects
   a.) Specify the edge database source and queries to related selected nodes. This can be done using a user SQL query associated with the edge object.
   b.) Specify the edge view—this includes all GUI and rendering aspects for the edge including color and line style.

5. Repeat this process until all graphs, node declarations, and edge declarations are included and interlinked together to form the semantic network application.

Figure 2:
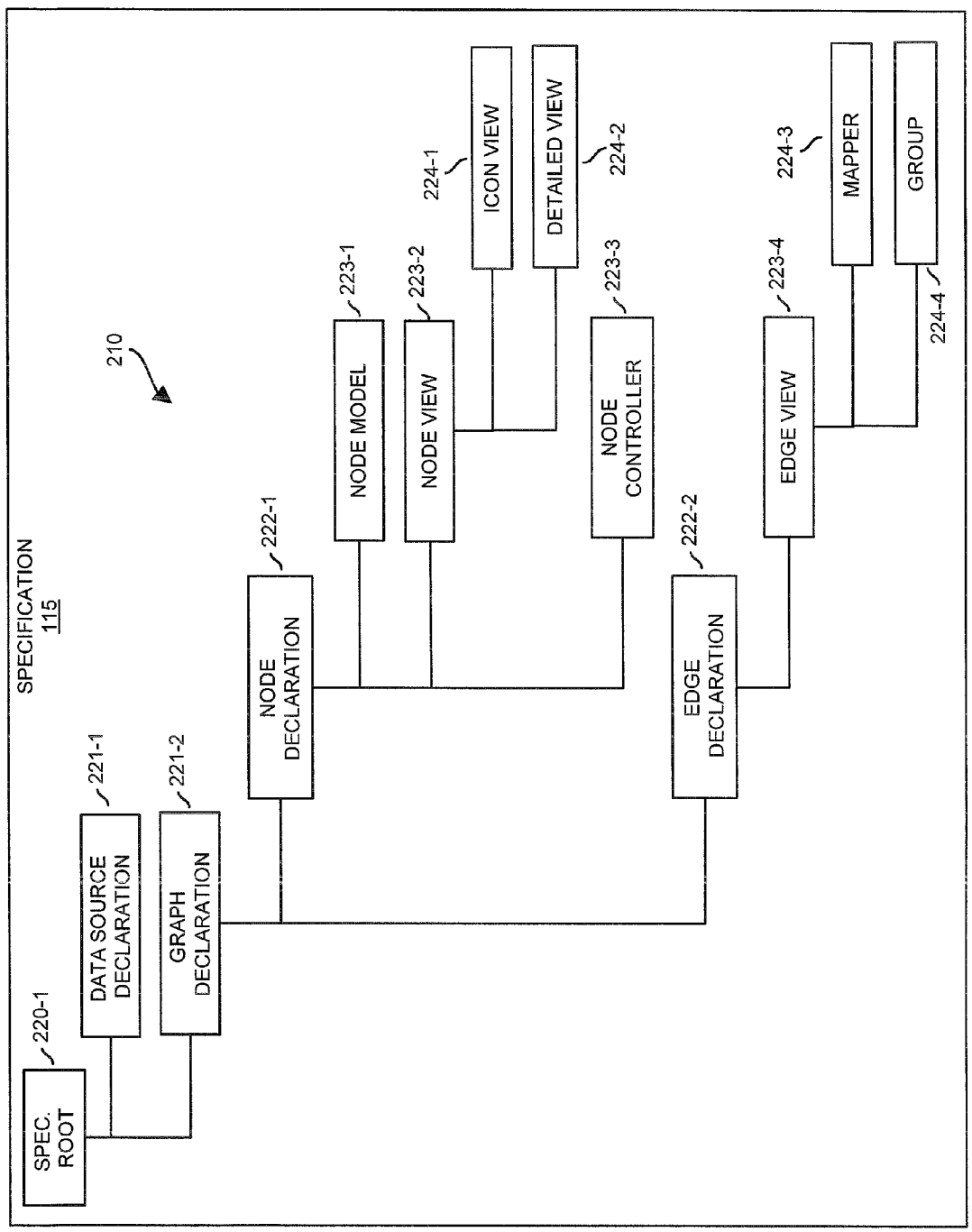
FIG. 2 is an example diagram of a specification and hierarchy of declaration information according to embodiments herein.
Figure 3:
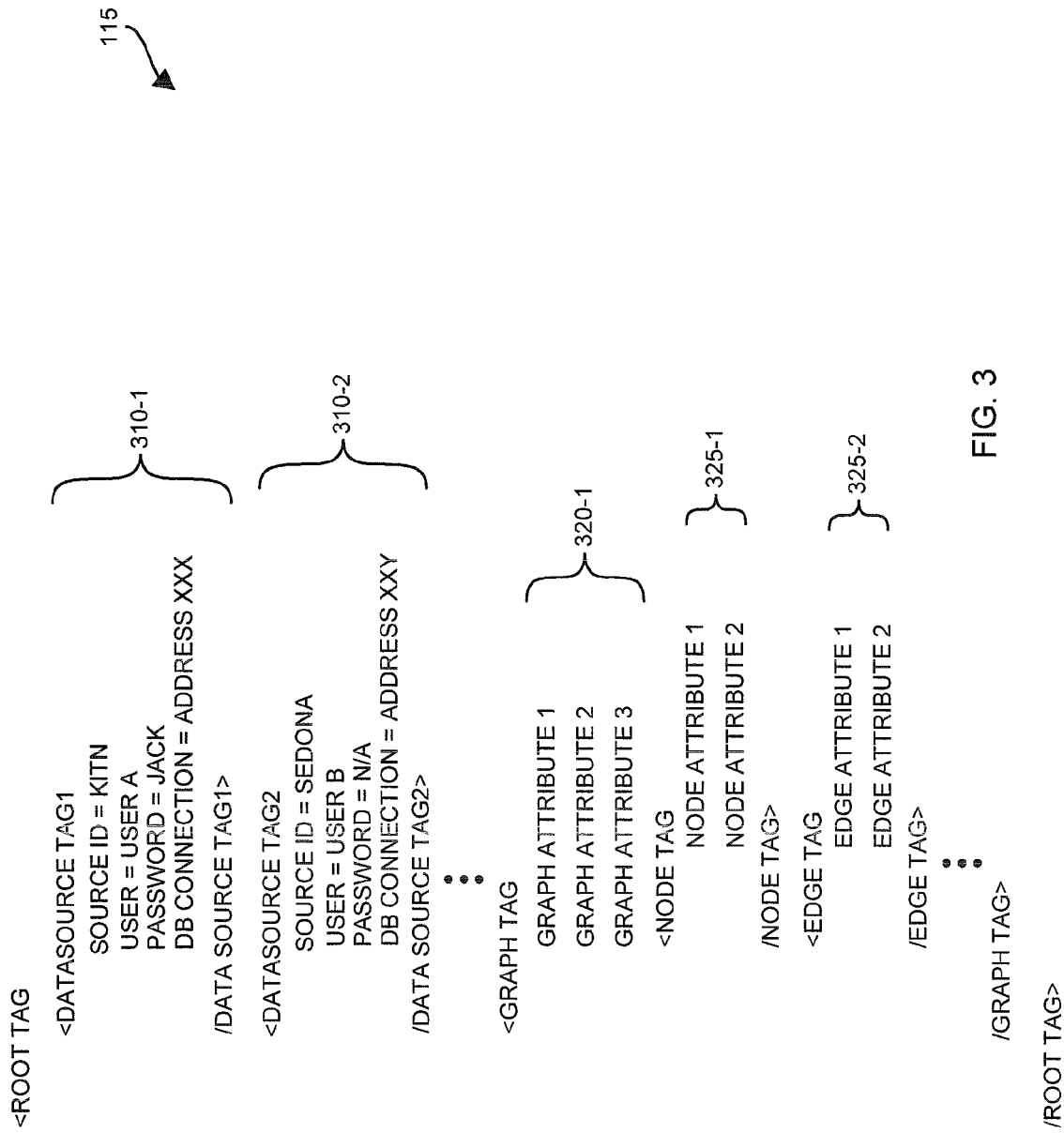
FIG. 3 is an example diagram illustrating use of a markup language and corresponding tags to define a navigable semantic network according to embodiments herein.

FIGS. 2 and 3 more particularly describe a way to specify attributes of a corresponding semantic network in a specification according to embodiments herein. For example, FIG. 2 is a diagram of an example specification 115 (e.g., a graphical description file) including a hierarchy 210 of specification data defining a corresponding semantic network model 125.

More specifically, the example embodiment of specification 115 as shown in FIG. 2 includes a hierarchy 210 including regions of tagged data. The root of the hierarchy 210 is specified by region 220-1 labeled "specification root". Beneath region 220-1 in the hierarchy 210 resides region 221-1 (labeled "data source declaration") and region 221-2 (labeled "graph declaration"). Beneath region 222-2 in the hierarchy 210 resides region 222-1 (labeled "node declaration") and region 222-2 (labeled "edge declaration"). Beneath region 222-1 in the hierarchy 210 resides region 223-1 (labeled "node model"), region 223-2 (labeled "node view"), and region 223-3 (labeled "node controller"). Beneath region 223-2 in the hierarchy 210 resides region 224-1 (labeled "icon view") and region 224-2 (labeled "detailed view"). Beneath region 222-2 in the hierarchy 210 resides region 223-1 (labeled "edge view"). Beneath region 223-4 in the hierarchy 210 resides region 224-3 (labeled "mapper") and region 224-4 (labeled "group").

Each of the regions of specification 115 can be populated with different types of specification information in accordance with a markup language such as XML (e.g., Extensible Markup Language).

For example, the specification 115 can include four major parts to define the semantic network model 125:

1. Data Source Declaration (e.g., region 221-1)
2. Graph Declaration (e.g., region 221-2)
3. Node Declaration (e.g., region 222-1)
4. Edge Declaration (e.g., region 222-2)

Each GRAPH (e.g., specification) can include one or more NODE and EDGE declarations. Each NODE can consist of a model, view, and controller definition. Each EDGE can have an associated view definition. As discussed above, the hierarchical organization of four major parts of the specification 115 are shown in FIG. 2.

Each specification 115 (e.g., XML file) can have the following XML File Tags:

AGD—A root tag
  Attributes
    transitionspeed—transition speed of the graphs (in milliseconds, default=1800)
    radius—the distance between each node (in pixels, default=150)
    description—description of the AGD (not implemented)
  Children Tags
    DataSource
    Graph
    Node
      NodeModel
      NodeView
        IconView
        DetailedView
      NodeControl
    Edge
      EdgeView
      Mapper
      Group Data Source Declaration
  Datasource—This tag contains information about one or more database connections. The data source declaration indicates what databases will be accessed to instantiate different nodes of the semantic network model 125.
  Attributes
    id—the identifier of the data source
      this ID will be referred to by the NodeModel and Edge Tags
    dbuser—database user name for the DB connection
    dbpswd—database password of the DB connection
    dbconn—DB connection string
    dbtype—vendor, e.g., {mysql|oracle}, the default=Oracle Graph Declaration
  Graph—This tag represents a Graph View. The graph view tag specifies all possible nodes and elements that can be displayed in a respective view. The graph view tag also can specify behavior associated with each node. For example, the graph view information can specify constraints with respect to how a user may navigate, explore/browse the network of nodes in a semantic network.
  Attributes
    id—identifier of the graph
    rootType—the type of the root node of this graph
      this attribute is used by "view" method
    transitionspeed—transition speed of the graphs (in milliseconds, default=1800)
      this will override the AGD's transitionspeed
    radius—the distance between each node (in pixels, default=150)
      this will override the AGD's radius
    description—description of the GraphView (not implemented)
  Children Tags
    Node (described below)
    Edge (described below)

Node Declaration
  Node—This tag is a node definition for a node in the graph (e.g., semantic network). It's a combination of NodeModel, NodeView, and NodeControl defined below in the NODE MVC (Model—View-Control) detail section below. Each node serves as a container for a specified collection of data. The model aspect specifies the data source, the view specifies how the node will be rendered graphically, and the control aspect indicates all possible behaviors for the node.
  Attributes
    id—the identified of this Node Tag
      This will be referred by sourceNode and targetNode attributes in the Edge Tags below
    type—the type of this Node Tag. It should match the type of its NodeModel, NodeView, and NodeControl.
    model—this attribute contains the id of the NodelModel the node uses
    view—this attribute contains the id of the NodeView the node uses
    control—this attribute contains the id of the NodeControl the node uses
    searchable—{true|false}—this attribute determines whether this node is searchable. The NodeModel of searchable Node must have search attribute properly defined.
  NodeModel—this tag contains information about the attributes of a node and how to set/search them.

Attributes
   id—id of the NodeModel
      It will be referred in Node Tag
   Type—type of this node
      It can be used for consistency checking
   dbID—id of the database corresponding to the SQL statement in the source attribute
   source—SQL statement for setting attributes of a node model
      Format:
         Select field1, field2, . . . , fieldn from TableName where field1 in (#param#)
         Field1, field2, . . . fieldN are the column names containing the data for the NodeModel's attribute.
         Field1 is the primary key of the table
         #param# would be replace the a set of primary keys of the nodes using this NodeModel
   search—SQL statement for selecting the primary key by using some search term
      Format
         Select primary_key_field from where target field=#param#
Children Tags
   att—this tag represents an attribute/field of a Node-Model
      Attributes
         name—name of the attribute
         from—the column name from the SQL statement in the source attribute of NodeModel
         There is an attribute called "real_id". This attribute will be use to replace the #param# notation.
         real_id would replace #param# in the NodeModel's source attribute
         real_id would replace #param0# and #param1# in Edge Tag's source attribute
NodeView—this tag contains information about the rendering of a node
   Attributes
      id—id of the NodeView
         It will be referred in Node Tag
      type—type of this node
         It could be use for consistency check
   Children Tags
      IconView
      DetailedView
   IconView—this tag contains the information about rendering the node IconView
      Attributes
         width—width of the box (in pixels)
         height—height of the box (in pixels)
         type—{ImageTop|ImageLeft} (not implemented)
         imagePath—location of the Image
         text—HTML text that would be displayed. #Attribute_Name# would be replaced by the corresponding attribute value
         Ex: text="<b> Name: </b> #name#"=>
         Output="Name: John Smith"
   DetailedView—this tag contains the information about rendering the node
      Attributes
         width—width of the box (in pixels)
         height—height of the box (in pixels)
         text—HTML text that would be displayed. #Attribute_Name# would be replaced by the corresponding attribute value
         Ex: text="<b> Name: </b> #name#"=>
         Output="Name: John Smith"
         Note: text also support IMG tag (e.g. "<img src=' . . . '/>") However, there are some issues on the rendering. It is recommended to put the IMG tag on the last line if one need to use it.
   NodeControl—this tag contains information about the controls/actions supported for a node. Each of the Control in NodeControl would appear on the context menu when the user pick (+) at a node.
      Attributes
         id—id of the NodeModel
            It will be referred in Node Tag
         Type—type of this node
            It could be use for consistency check (not implemented yet)
      Children Tags
         Control
      Control—
         Attributes
            label—label to be shown on the context menu (optional)
            method—{view|email|openURL|javascript|mark|annotate|delete}—actions/commands for the node
            param—parameter—see below for details
            param2—parameter—see below for details
Edge Declaration
   Edge—this tag is an edge definition for an edge in the graph. Currently, edges use the MVC paradigm but only have a View aspect. Edges are used to connect nodes in the radial graph diagram.
      Attributes
         level—{1|2} level of the edge
            level 1 means edges connect the root to its children
            level 2 means edges connect the root's children to their own children
         size—limit the number of edges created by this Edge Definition
         Note: In order for the size attribute to work properly, the SQL in the source attribute will be sorted by the real_ID's of the sourceNode.
         dbID—identifier of the database corresponding to the SQL statement in the source attribute
         source—the SQL representing the relationship between the root Node and Node Level 1+the relationship between Node Level 1 and Node Level 2
         Format
            For Level 1:
            "SELECT field2 FROM table_name WHERE field1=#param0#
            field2 should the column_name of the column that contains real_id of targetNode
            For Level 2:
            "SELECT field2,field3 FROM table_name WHERE field2 in (#param1#)"
            field2 should the column_name of the column that contains real_id of sourceNode
            field3 should the column_name of the column that contains real_id of targetNode
   EdgeView—
      Attributes
         id—id of the EdgeView
            This will be referred by the view attribute in Edge Tag
         color—color of the edge in hexadecimal format (i.e. 0xff00ff)

label—label of the edge
type—
pointto—{source|target}
style—{solid|dash|dotted}
Children Tags
  Mapper
  Group
Mapper—this tag contains information on how to map a node from one DataSource to another.
  Attributes
    Level—{1|2} should be the same as the level of the parent Edge Tag
    targetNode—should contain the node id of the Node Tag that want to map to
    size—limit the number of edges created by this Edge Definition
    dbID—id of the database corresponding to the SQL statement in the source attribute
    source—SQL statement for mapping two different Node Tags
      Format
        "SELECT sourceNodeField, targetNodeField FROM mapping_table WHERE sourceNode-Filed in (#param1#)
Group—this tag contains information on how to group nodes together. It is usually use with the Mapper Tag, but it can also be use alone.
  Attributes
    Level—{1|2} should be the same as the level of the parent Edge Tag
    sourceNode—should be the same as the sourceNode of the parent Edge Tag
    targetNode—should contain the node id of the Node Tag that want to be grouped
    dbID
    size—limit the number of edges created by this Edge Definition
    dbID—id of the database corresponding to the SQL statement in the source attribute
    source—SQL statement for group the Node Tags
      Format
        "SELECT sourceNodeField, targetNodeField FROM mapping_table WHERE sourceNode-Filed in (#param1#)

FIG. 3 is an example diagram illustrating a specification 115 defining a corresponding semantic network model 125 according to embodiments herein. As shown, tags in the specification 115 identify different regions of the specification 115. Each of the different regions includes different types of specification information depending on the tag type. For example, DATASOURCE TAG 1 delineates region 310-1. The parameter information (e.g., Source ID, User, Password, . . . ) in region 310-1 identifies a corresponding data source and access information associated with nodes in the semantic network model 125.

In a similar manner, DATASOURCE TAG 2 delineates region 310-2 of specification 115. The parameter information (e.g., Source ID, User, Password, . . . ) in region 310-2 also identifies a corresponding data source and access information associated with nodes in the semantic network model 125.

In the context of the present example in FIG. 1, the data source information in region 310-1 and region 310-2 specify resources such as databases (or other types of storage resources) associated with storage 185 for instantiating nodes in the semantic network model 125.

Referring again to FIG. 3, the specification 115 can include a GRAPH TAG for indicating a location of graph attributes in region 320-1, a NODE TAG to specify a location of node attributes in region 325-1, and an EDGE TAG to specify a location of edge attributes in region 325-2, and so on.

As mentioned above, creation of the specification 115 via use of declarative statements (e.g., tagged regions of attributes) as described herein enables a semantic network developer to easily and efficiently define corresponding attributes of very complex semantic network models.

Figure 4:
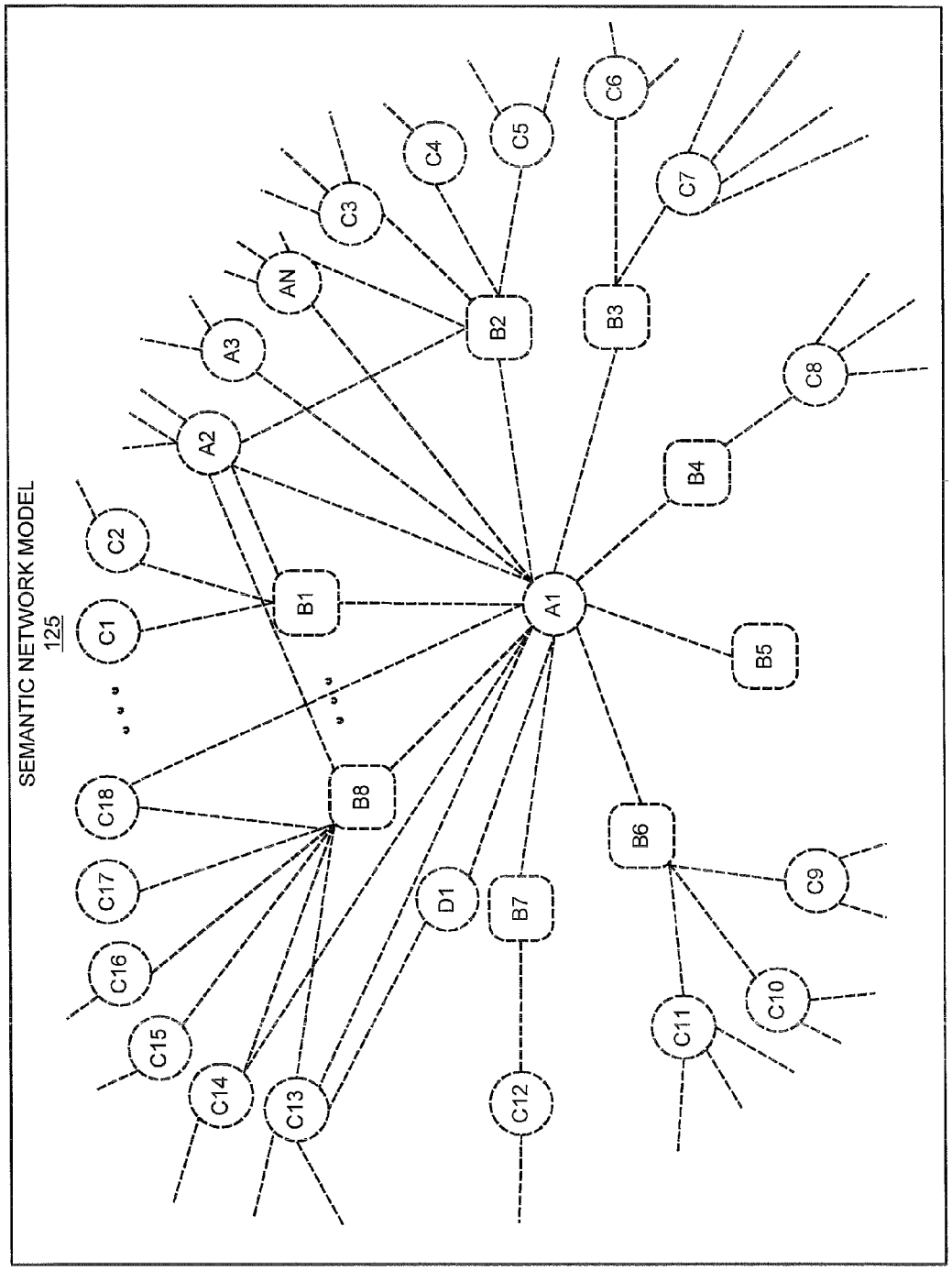
FIG. 4 is an example diagram illustrating nodes of a semantic network model according to embodiments herein.

FIG. 4 is an example diagram illustrating a semantic network model 125 generated based on specification 115 according to embodiments herein. As shown, the semantic network model 125 includes a complex network of related nodes including nodes A1, A2, A3, . . . AN as well as nodes B1, B2, B3, B4, B5, B6, B7, B8, C1, C2, C3, C4, C5, C6, C7, C8, C9, C10, C11, C12, C13, C14, C15, C16, C17, C18, and so on. Links (e.g., dotted lines) represent relationships between the nodes. This semantic network model 125 can include any number of nodes and relationships. The semantic network model 125 can include multiple networks of interconnected or related nodes.

The nodes in semantic network model 125 can represent any type of resource information as specified by the declaration. For example, assume in this example that each of nodes A1, A2, A3, etc. represents different employees in an organization. Each of nodes B1, B2, B3, etc. can represent different areas-of-expertise associated with employee A1. Each of nodes C1, C2, C3, C4, etc. can represent other employees in the organization.

Links emanating radially outward from nodes represent relationships between nodes. For example, the links emanating radially outward from node B8 can indicate relationships with other employees (e.g., employees as represented by nodes A1, C13, C14, C15, C16, C17, and C18) who share the area-of-expertise as represented by node B8. Thus, in one embodiment, the semantic network model 125 can include a heterogeneous mix of different node types and node relationships. In other words, not every node in the example semantic network model needs to represent an employee.

However, note that in other embodiments, each of the nodes in the semantic network model 125 can represent a common type of resource such as an employee in an organization.

Figure 5:
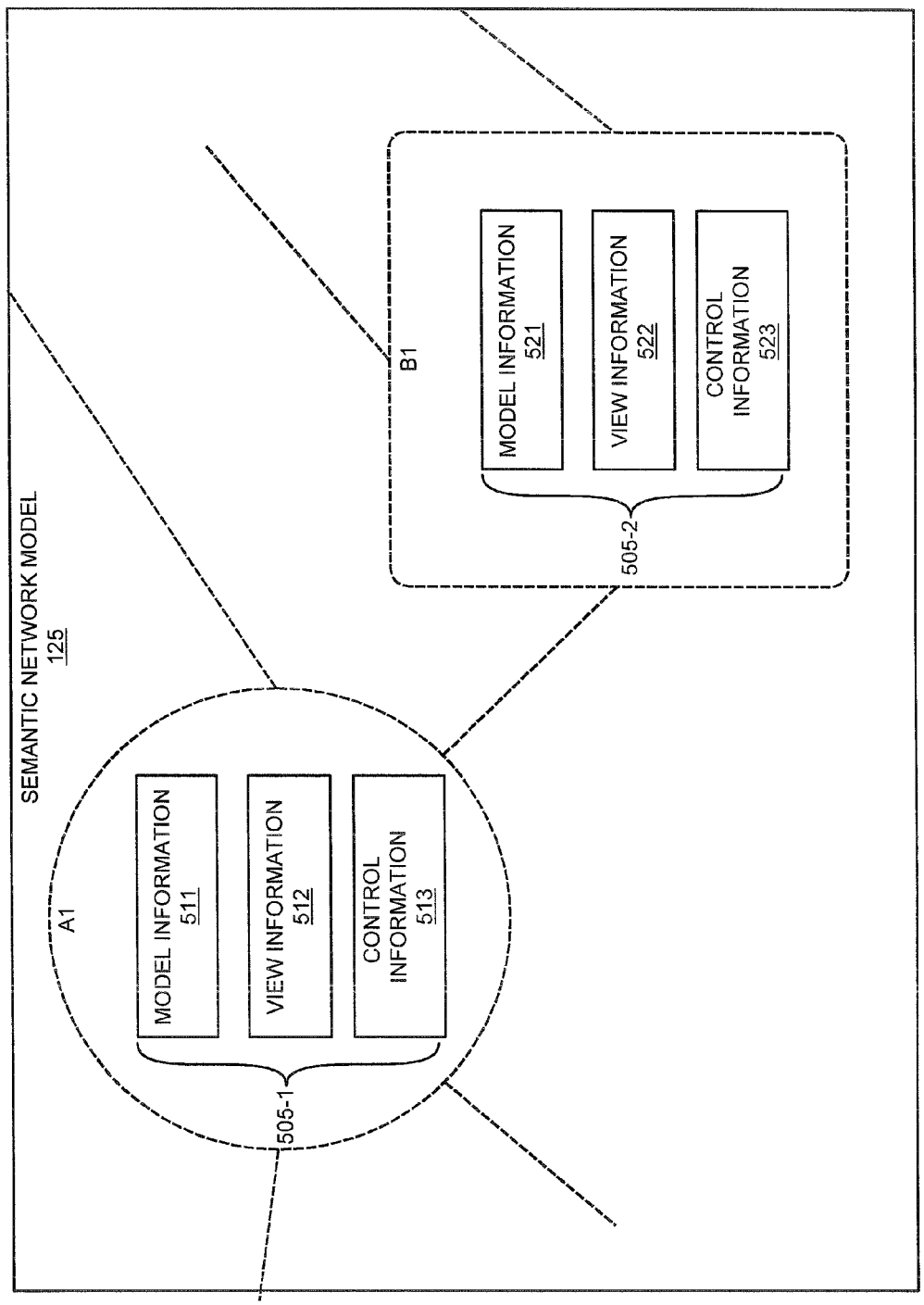
FIG. 5 is an example diagram illustrating different types of node information maintained for each of multiple nodes in a semantic network model according to embodiments herein.

FIG. 5 is an example diagram illustrating types of information maintained for each node in the semantic network model 125 according to embodiments herein. For example, each node (e.g., internal node and edge node) in the semantic network model 125 has corresponding model information, view information, and control information maintained in the semantic network model 125.

As mentioned above, the view instantiation engine 140 uses the node information 505 to instantiate different portions of the semantic network for display by presentation engine 150. Recall that the compiler 120 processes (e.g., parses, compiles, etc.) the specification 115 to produce the node information 505 for each node in the semantic network model 125.

As shown, node A1 has corresponding node information 505-1, which includes model information 511, view information 512, and control information 513. Node B1 has corresponding node information 505-2, which includes model information 521, view information 522, and control information 523. In a similar manner, each node of the other nodes in the semantic network model 125 has corresponding model information, view information, and control information.

In one embodiment, the data MODEL information associated with each node defines a corresponding structure of the semantic network including relationships of the subject node with other nodes in the semantic network. The data MODEL information can specify object data classes, attributes, database tables, database columns, etc. (in storage 185 such as a federation of databases) that contain corresponding node data and node relationship information.

For example, the model information 511 (e.g., data MODEL information) for node A1 includes data enabling the view instantiation engine 140 to identify that node B1 is related to node A1 and a type of relationship between node A1 and B1. The view instantiation engine 140 then can access node information of the related nodes by accessing model information, view information and control information associated with node B1.

The view instantiation engine 140 repeats the above process to learn about a given node and any number of related nodes in the semantic network model 125. That is, the view instantiation engine access node information with other nodes to learn how to display the related nodes, commands that can be applied to the related nodes, etc.

Typically, the view instantiation engine 140 accesses and processes information associated with a portion of the nodes (rather than every node) in the semantic network model 125 for viewing by a respective user. For example, as will be discussed later in this specification, a user can select a focal node. In response to the selection, the view instantiation engine 140 accesses the (node information 505) model information, view information, and control information for the focal node. The view instantiation engine 140 also the view instantiation engine 140 accesses the (node information 505) model information, view information, and control information for a number of nodes directly and indirectly related to the one or more focal node.

As mentioned, the number of nodes (and corresponding node information 505) processed by the view instantiation engine 140 can depend on what the node information 505 states and/or input provided by a respective viewer. For example, the node information 505 associated with a given node in the semantic network model 125 can indicate which other related nodes to simultaneously display in a view on display screen 130. A user may also provide input indicate which node and a scope of related nodes to simultaneously display on display screen 130.

As mentioned above, the node information 505 for a respective also includes view information. The view information 512 describes how each of multiple display elements (e.g., text, node body, links, etc.) for the node will be presented or rendered in the corresponding view to be displayed on display screen 130. More specifically, the view information 512 can include attributes indicating how nodes in the semantic network will appear, how nodes are titled, how attribute values appear, and how links/edges between nodes are drawn (color, thickness, etc.). Additionally, Icon and Detailed Views can be supported to show varying levels of information depending on selection focus.

Thus, the view information associated with each respective node can include display rules associated with the semantic network. As their name suggests, the display rules can define how to display different resource nodes and relationships amongst the different resource nodes in the navigable semantic network.

The node information 505 also can include CONTROLLER specification information indicating commands that can be applied to the corresponding node and corresponding actions to be executed in response to a command. The listing of commands can include commands to change an object focus, use a different graph, etc. Other commands include commands for "actionable" nodes to initiate an e-mail, hide a node, or make an annotation. Thus, based on the controller information can identify: i) different navigation input commands that can be applied to respective resources (e.g., nodes, links, etc.) of the semantic network to navigate about different views of the semantic network, and ii) different actions to be taken in response to receiving the navigation input commands from a user navigating the semantic network model 125.

As previously discussed, the specification 115 includes the specific information used to produce the node information 505 for each node in the semantic network model 125.

For example, the Data Source Declaration specifies where node data and edge data for the respective nodes can be found in storage 185.

The GRAPH declaration allows a programmer or developer to specify one or more semantic network structures consisting of various nodes and edges. Each graph can define a single model, which includes all data nodes and their relationships and explicitly enumerates all possible user navigation of the network and his/her actions within the semantic network graph. An application may consist of multiple graphs or networks of nodes, which may be interlinked to form larger more comprehensive applications. When displayed, nodes in a first network of the semantic network can be displayed in accordance with a first shape, nodes in a second network of the semantic network can be displayed in accordance with a second shape, and so on.

Relationships between the nodes of the different network in the semantic network can be conveyed via different colored links. For example, links between nodes in a first network of the semantic network can be yellow (when so displayed), links between nodes in a second network of the semantic network can be red (when so displayed), and so on. Patterns as well as other types of distinctive indicators can be used to differentiate the links amongst each other.

Links between nodes in the first network and nodes in the second represent "crossover" links from the first network to second network. Thus, according to embodiments herein, a viewer can traverse amongst nodes in different networks by selecting appropriately displayed nodes displayed in the graphical user interface 160.

As mentioned above, for each graph specified in the specification 115, there are corresponding NODE declarations and EDGE (e.g., edge node) declarations. The NODE specifications (e.g., declarations) can specify actual data in for generating a graph.

Also, each Node in the semantic network model 125 can be configured to use the Model-View-Controller paradigm and consists of Node Model information, Node View information, and Node Controller information.

It should be noted that the Model-View-Controller paradigm (e.g., semantic network description based on node information 505) can be extended to support multiple interconnected graphs of sub-models to create and aggregate increasingly more comprehensive and sophisticated semantic network graphs via the specification 115 (e.g., graph descriptor) or multiple specifications so that application functionality increases but only incremental graph, node, and edge definitions to the specification 115 are needed. Thus, multiple specifications can be used to create a semantic network model 125 including multiple interconnected semantic networks.

Operations associated with the view instantiation engine 140 can be summarized as follows:

Accessing the semantic network model 125 can include: i) identifying, in the semantic network model 125, resource node information 505 associated with a given resource node (e.g., a selected focal node of the semantic network model 125), ii) based on the resource node information 505 for the given node, identifying a group of neighboring resource nodes in the semantic network model 125 related (e.g., linked) to the given resource node, and iii) identifying resource node information associated with the group of neighboring resource nodes.

Instantiating the portion of the navigable semantic network from the perspective of the given resource node in the navigable semantic network can include generating the instantiated portion of the navigable semantic network in accordance with i) the resource node information associated with the given resource node as indicated in semantic network model 125, and ii) the resource node information associated with the group of neighboring resource nodes as indicated in the semantic network model 125.

Figure 6:
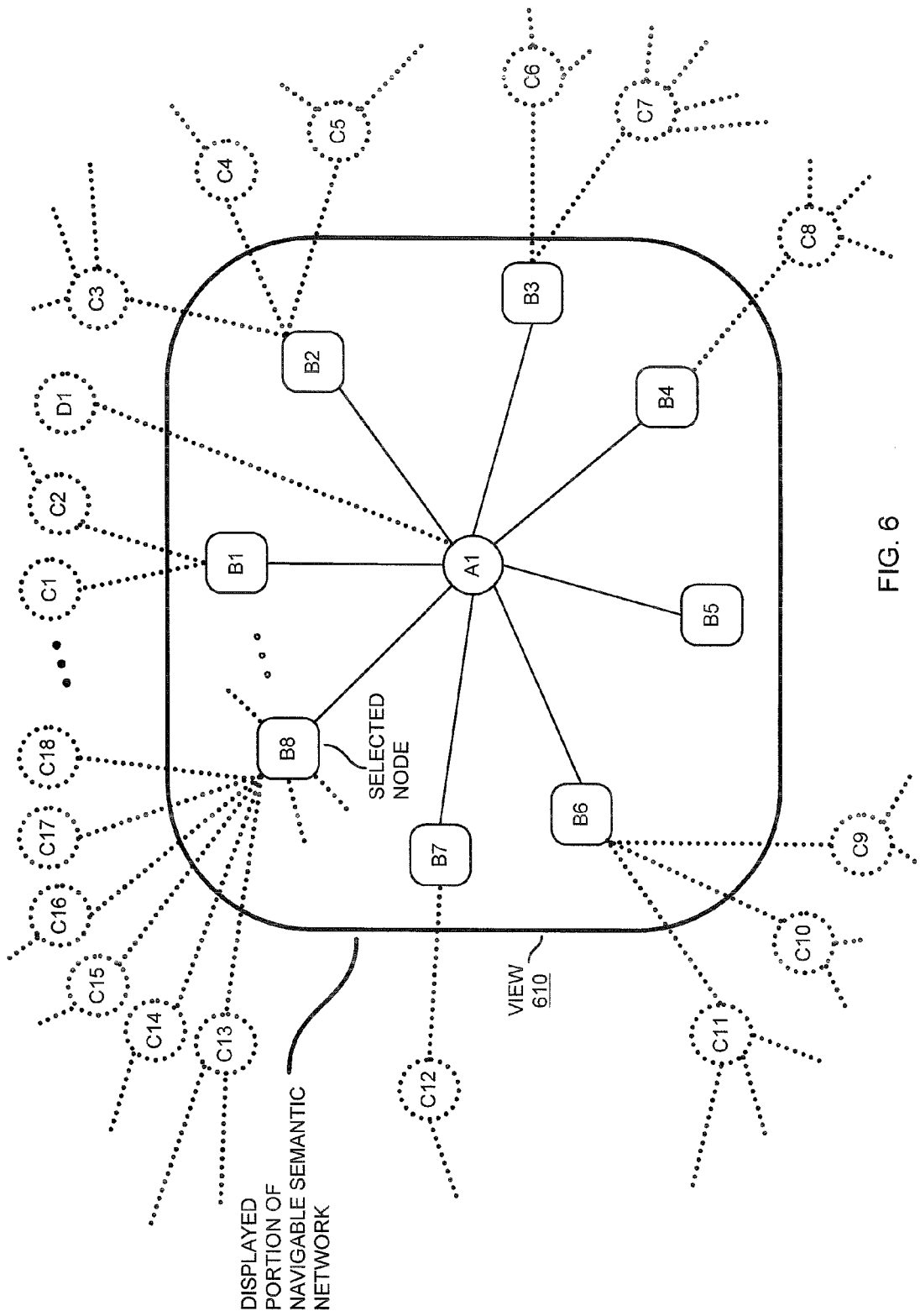
FIG. 6 is an example diagram illustrating a displayed portion of a navigable semantic network according to embodiments herein.

FIG. 6 is an example diagram illustrating a viewed portion of the semantic network according to embodiments herein. Assume that the viewer of display screen 130 selects node A1 as a focal node for display in graphical user interface 160 on display screen 130. In response to such selection, the view instantiation engine 140 instantiates a portion of the semantic network including node A1 and related nodes for display by presentation engine 150 on display screen 130.

To create the view 610 for display on display screen 130, the view instantiation engine 140 accesses node information 505-1 associated with node A1. As previously discussed, the node information 505-1 indicates metadata associated with node A1 such as which nodes are related to node A1, how to display node A1 in a respective view, where to find data in storage 185 to create a corresponding visual representation of the node, etc.

The related nodes may include nodes that are directly related to node A1. These include first level nodes B1, B2, . . . , B8. In the context of the present example, the view 610 is limited to first level nodes associated with node A1. Thus, second level nodes such as C1, C2, . . . , C18 are not shown (e.g., they are hidden) in view 610.

For each node of the first level related nodes (e.g., nodes B1, B2, . . . , B8) to be displayed in the view 610, the view instantiation engine 140 accesses corresponding node information in the semantic network model 125 to identify how to display such nodes, where to find data for creating the nodes, commands that can be applied to the nodes, etc. The node information 505 for each node can specify different ways to display the corresponding node depending on whether the node is a focal or non-focal node in a view.

In accordance with the node information for the nodes in the semantic network model 125 and corresponding data in storage 185, the view instantiation engine 140 creates a bitmap, graphic definition, etc. (e.g., instantiated portion of semantic network 145) associated with view 610. The presentation engine 150 uses the instantiated portion of semantic network 145 to render view 610 on the display screen 130.

As shown, the solid lines in view 610 represent what graphical elements appear on the display screen 130 for viewing by a user. Graphical elements and links rendered via dotted lines represent other nodes in the semantic network model 125 associated with the viewed nodes. However, in one embodiment, such nodes are not displayed on the display screen 130. Thus, the presentation engine 150 can at least initially display a limited portion of a semantic network about a selected node rather than display every possible node at the same time in view 610. In other words, certain nodes can be hidden so that the view 610 of node is not cluttered with an excessive amount of display information.

A user viewing view 610 on display screen 130 can provide different types of input with respect to the view 610. For example, a user can apply zoom commands (e.g., zoom in and zoom out commands) to view larger or smaller portions of the semantic network, hide commands to remove certain selected elements from a view, show commands to display hidden graphical elements (e.g., nodes, links representing relationships, labels, text, etc.), selection commands specifying a new node to be a focal node for the view, etc.

Assume in the present example that a user selects (e.g., clicks on) node B8 displayed in view 610. In response to such an action, the presentation engine 150 notifies the view instantiation engine 140 of such a selection. The view instantiation engine 140 utilizes the node information 505-1 (e.g., controller information 513) in the semantic network model 125 to identify what action to take in response to receiving the command. In this example, assume that the controller information 513 indicates that an action to be taken in response to selection of node B8 will include updating the view 610 displayed in the graphical user interface 160 so that the selected node is now a centroid or a focal node in an updated view (rather than A1 being a focal node).

Since node B8 will now be a focal node in the updated view, the view instantiation engine 140 accesses node information (in the semantic network model 125) associated with node B8. In a manner as discussed above, the view instantiation engine 140 identifies which nodes in the semantic network model 125 are directly (and possibly indirectly) related to the node B8. In the present example, based on the corresponding node information associated with node B8, the view instantiation engine 140 would identify that nodes A1, C13, C14, C15, C16, C17, and C18 are all nodes directly related (e.g., have a direct link) to node B8. The view instantiation engine 140 instantiates the new in accordance with the method discussed above.

Figure 7:
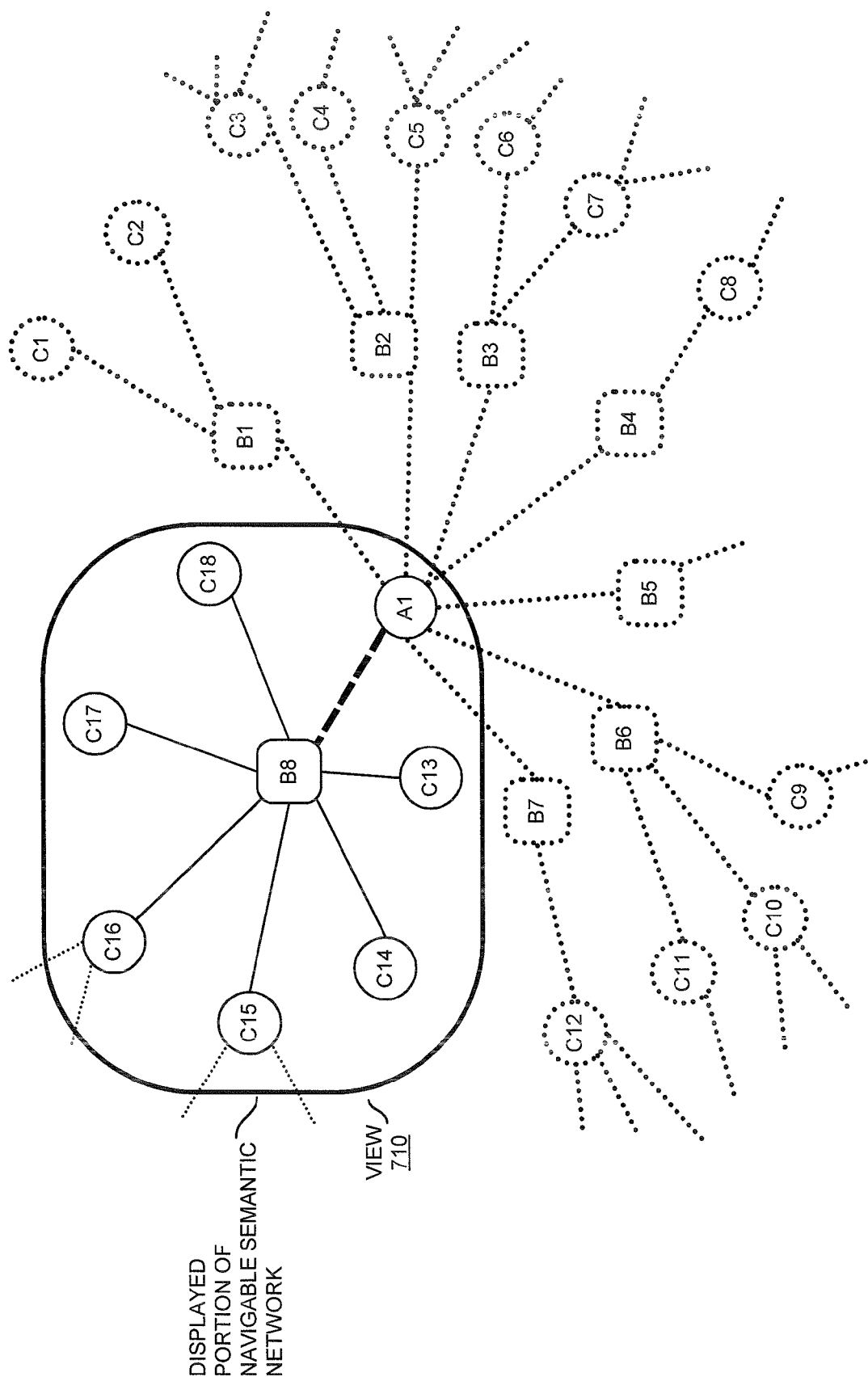
FIG. 7 is an example diagram illustrating a displayed portion of a navigable semantic network according to embodiments herein.

FIG. 7 is an example diagram illustrating an updated view (based on selection of node B8 in view 610 of FIG. 6) according to embodiments herein. For each of nodes A1, C13, C14, C15, C16, C17, and C18 to be displayed in the updated view 710 in FIG. 7, the view instantiation engine 140 accesses corresponding node information in the semantic network model 125 associated with each of these nodes (in a manner similar to that as discussed above) to identify how to display such nodes, where to find data for creating the nodes, commands that can be applied to the nodes, etc. In accordance with the node information for the nodes in the semantic network model 125 and corresponding data in storage 185, the view instantiation engine 140 creates a new bitmap or definition (e.g., instantiated portion of semantic network 145) associated with view 710.

The presentation engine 150, in turn, uses the instantiated portion of semantic network 145 (e.g., an updated view including node B8 as a focal node) to render view 710 on the display screen 130 as in FIG. 7.

The link between node B8 and node A1 can be displayed in a way to indicate that it is different than the links between node B8 and other nodes (e.g., C13, C14, . . . , C18). Displaying the links in different ways enables the presentation engine 150 to indicate special relationships such as that node A1 resides higher in a respective hierarchy than node B8 and that each of nodes C13, C14, C15, C16, C17, and C18 reside lower in the hierarchy than node B8. Thus, the view instantiation engine 140 can create an instantiation of view 710 to include valuable information conveyed to a viewer when displayed on display screen 130. In other words, the view instantiation engine 140 can enhance a radial view of nodes and corresponding relationships by including or overlaying hierarchical type information in the radial view.

As mentioned above, a respective viewer can apply commands such as zoom in and zoom out commands to view larger and smaller portions of a respective semantic network. Assume in the present example that a user initiates a zoom out command to view a larger portion of the semantic network. This can be done in a number of ways such as by selecting an option in a pull-down menu, clicking on a zoom out icon displayed in the graphical user interface 160, etc. In response to such an input, the view instantiation engine 140 updates the corresponding view for display on display screen 130.

Figure 8:
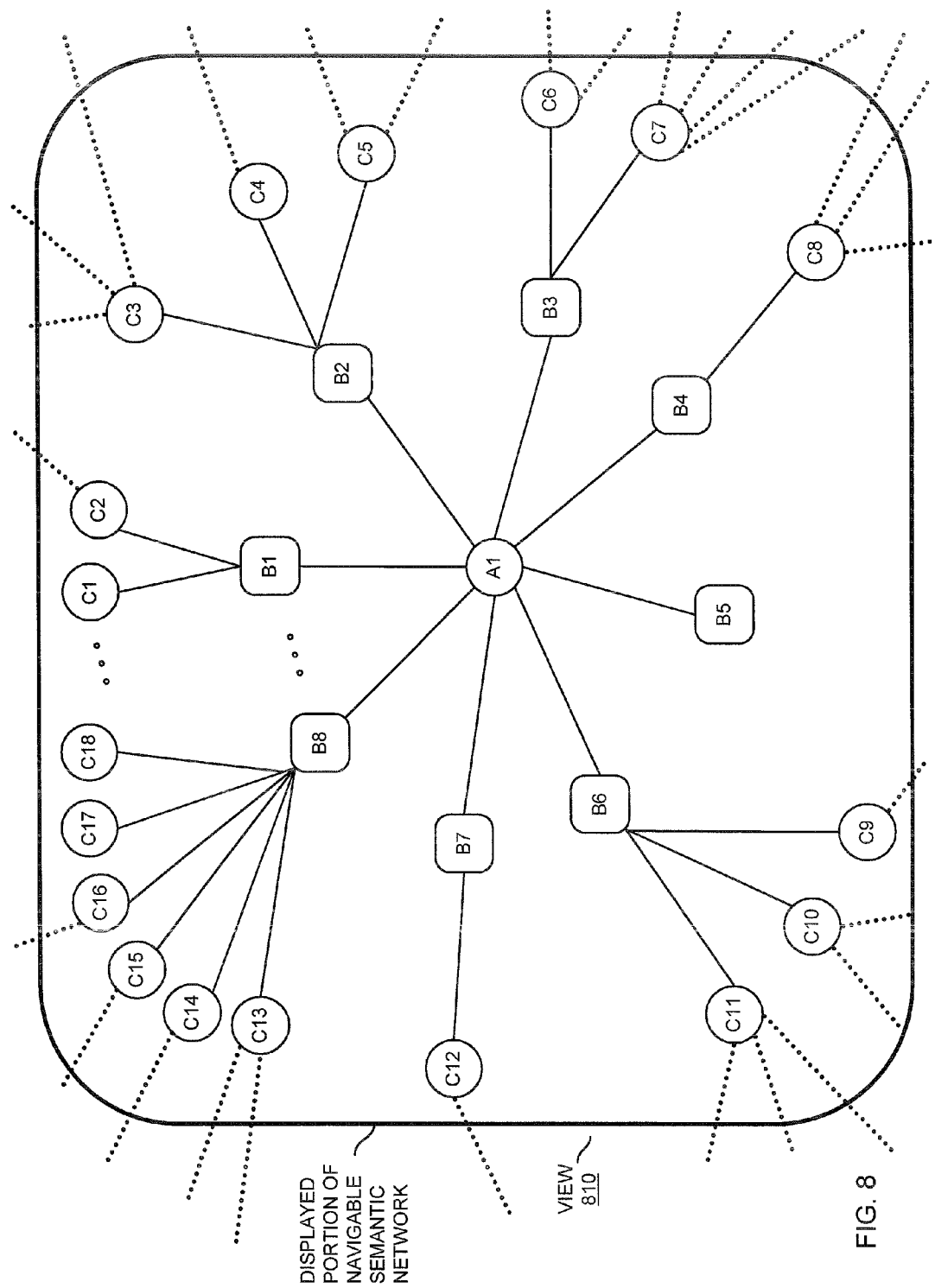
FIG. 8 is an example diagram illustrating a displayed portion of a navigable semantic network according to embodiments herein.

FIG. 8 is an example diagram illustrating an enlarged view of the semantic network in response to selection of a zoom out command according to embodiments herein. In response to receiving the zoom out command (In FIG. 7), the view instantiation engine 140 updates the instantiated view so that the view on display screen 130 includes additional nodes such as those nodes as shown in view 810.

As previously discussed, to generate view 810, the view instantiation engine 140 accesses corresponding node information in the semantic network model 125 to identify how to display such nodes, where to find data for creating the nodes, commands that can be applied to the nodes, etc. In accordance with the node information for the nodes in the semantic network model 125 to be displayed in the view 810 and corresponding data in storage 185, the view instantiation engine 140 creates a new bitmap or definition (e.g., instantiated portion of semantic network 145) associated with view 810 for presentation by presentation engine 150.

Thus, upon selection of the different resource nodes in the navigable semantic network model 125, the presentation engine 150 manager updates the graphical user interface 160 to include a new portion of the semantic network.

The focal point of a currently displayed portion of the navigable semantic network can vary depending on what type of resource node is selected by a viewer. In other words, a viewer can initially select and view a supervisor node and corresponding subordinate nodes. Upon selection of a subordinate node, the updated view can include different types of nodes such as product nodes indicating product lines associated with a subordinate. Accordingly a viewer can identify with which product lines a corresponding employee is affiliated. Selection of a product line node as a focal node can result in creation of a respective view including the product line as a focal node with radial links emanating from the product line to a number of employee nodes representing employees who work on the product line represented by the focal node.

In this way, a viewer can easily navigate about nodes in a semantic network to identify area-of-expertise of a given employee as well as other employees who share the same area-of-expertise.

Thus, in accordance with embodiments herein, the presentation engine 150 can render a graphical user interface 160 to include a first radial perspective of a portion of a semantic network as viewed from a first node of the semantic network. The presentation engine 150 can receive a selection of a second node of the semantic network, which is displayed in the first radial perspective.

In response to receiving the selection, the view instantiation engine 140 updates the instantiated portion of semantic network 145. The presentation engine 150 uses the instantiated portion of semantic network 145 to update the graphical user interface 160 to include a second radial perspective of a portion of the semantic network as viewed from the second node of the semantic network. Thus, based on successive or subsequent selection of the different nodes from one view to another, a viewer can "walk" through a very complex semantic network and view different resources and their relationship with other resources in the semantic network.

As discussed above, as a viewer "walks" through or navigates the semantic network to view new nodes and views, certain nodes in a view will become hidden from one view to another while other hidden nodes will appear in the updated views. Thus, a viewer can view resources and corresponding relationships in a unique manner. That is, as mentioned above, the user can navigate about the semantic network to view specific portions of the network while less important nodes are removed from viewing.

In a specific example embodiment, the nodes in the semantic network represent human resources and related information such as areas-of-expertise, areas-of-interest, documentation, etc. That is, a semantic network model 125 can define relationships amongst different resource nodes such as company nodes (e.g., representing different companies), employee nodes (e.g., nodes representing employees of an organization), project nodes (e.g., nodes representing different projects in an organization), product nodes, interest nodes, skills (i.e. expertise), etc. Links between the nodes indicate relationships amongst the resources as represented by the different nodes.

As a user traverses this type of semantic network, the user can view different types of networks that are connected at a common node. For example, a given node (of a first type) in the semantic network can be connected to other nodes of the same type as well as other nodes of different types. When traversing the semantic network, a viewer can choose whether to stay within a corresponding network and view a relationship of nodes of the same type (e.g., employees) or view another network related to the given node such as area-of-expertise, area-of-interest, etc. associated with the given node.

Figure 9:
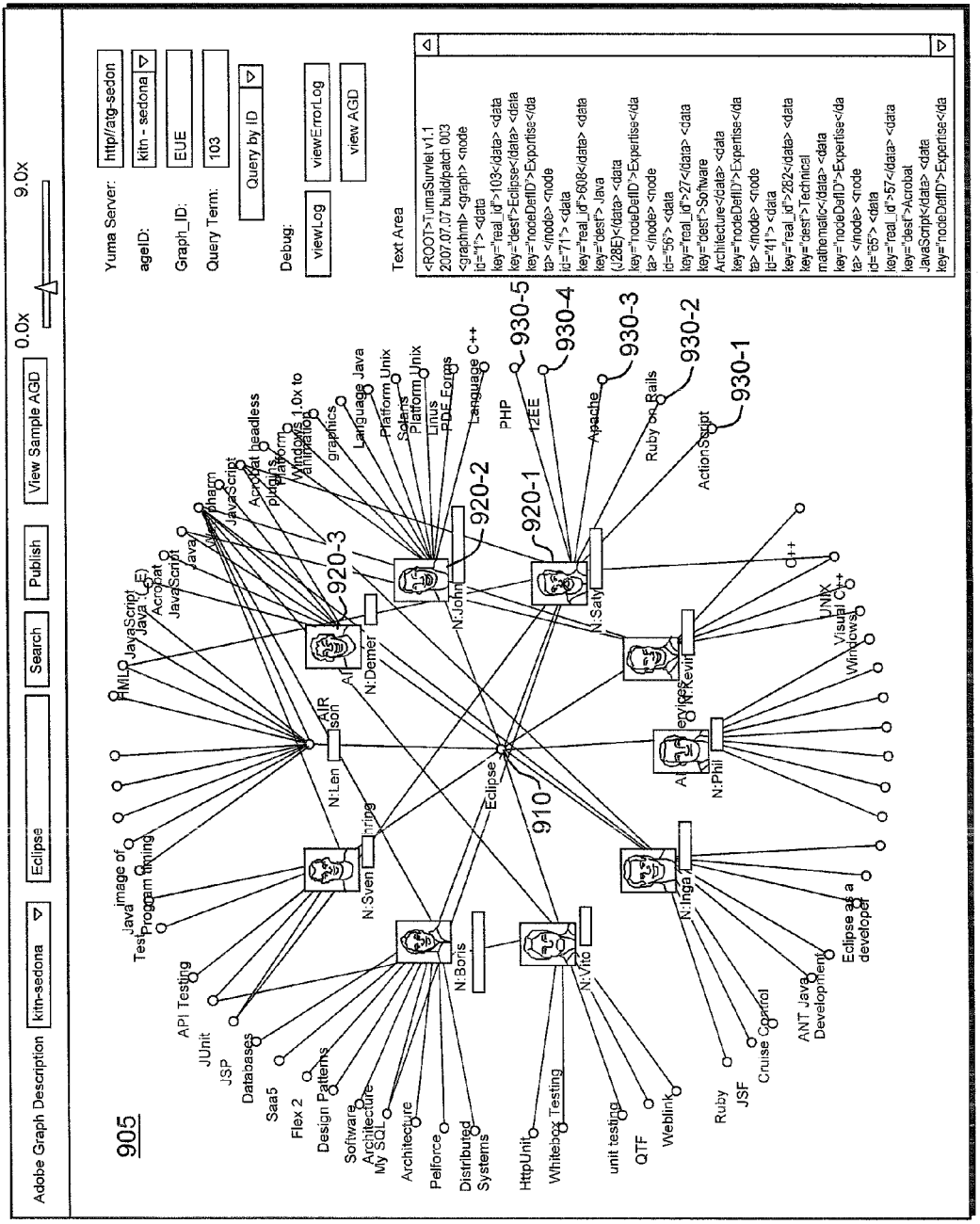
FIG. 9 is an example screenshot illustrating a display of nodes in a navigable semantic network according to embodiments herein.

FIG. 9 is an example screenshot 900 illustrating a relationship of multiple nodes according to embodiments herein. As shown, a user has selected a particular project (e.g., node 910) as a focal node of the view 905. In a manner as discussed above, the view instantiation engine access the node information 505 associated with the node 910. In the context of the present example, the view instantiation engine 140 identifies that node 910 is related to nodes 920-1, 920-2, 920-3, etc. The view instantiation engine 140 identifies that nodes 930-1, 930-2, 930-3, 930-4, and 930-5 are related to node 920-1, and so on. The presentation engine 150 initiates display of the different relationships for viewing by a user.

Thus, a viewer can specify a project node (i.e., node 910). The view instantiation engine 140 identifies persons (e.g., as represented by nodes 920) that work on the given project. The view instantiation engine 140 also identifies area-of-expertise for each of the persons on the selected project. When displayed, view 910 enables a viewer to easily and efficiently identify skills associated with persons on a particular project.

Figure 10:
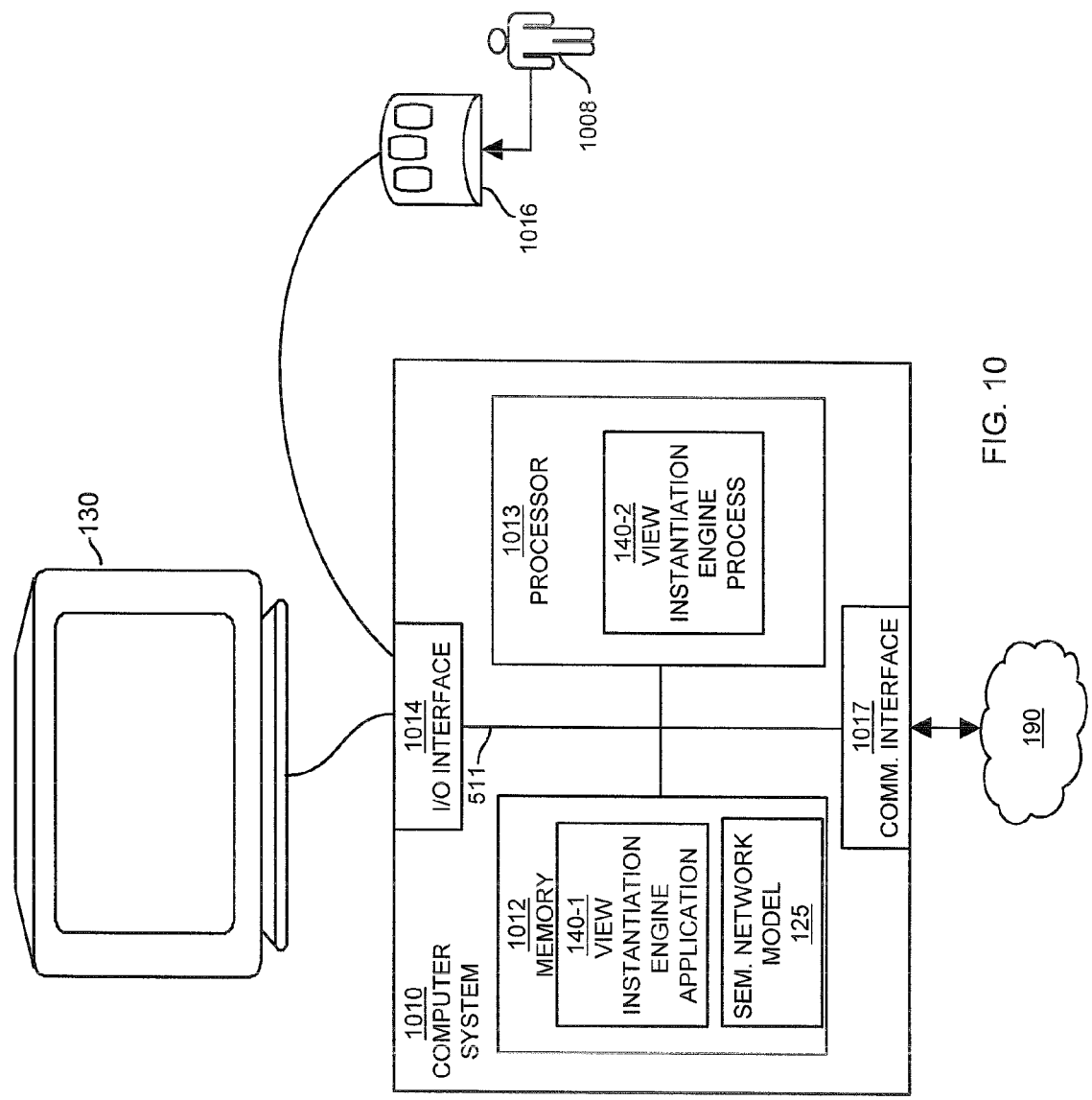
FIG. 10 is a diagram of an example architecture for executing software code according to embodiments herein.

FIG. 10 is a block diagram of an example architecture of a respective computer system 1010 (e.g., representing one or more computers, processes, etc.) for implementing a view instantiation engine 140 according to embodiments herein. Computer system 1010 can include computerized devices such as personal computers, servers that make up a website, workstations, portable computing devices, consoles, network terminals, processing devices, etc.

Note that the following discussion provides a basic embodiment indicating how to carry out functionality associated with the view instantiation engine 140 as discussed above and below. However, it should be noted that the actual configuration for carrying out the view instantiation engine 140 can vary depending on a respective application. For example, as previously discussed, computer system 1010 can also include multiple computers that carry out the processing as described herein.

As shown, computer system 1010 of the present example includes an interconnect 1011 that couples a memory system 1012, a processor 1013, I/O interface 1014, and a communications interface 1017.

I/O interface 1014 provides connectivity to peripheral devices 1016 (if such devices are present) such as a keyboard, mouse (e.g., selection tool to move a cursor), display screen 130, etc. User 1008 can provide input to computer system 1010 to control operations associated with display of respective views according to embodiments herein.

Communications interface 1017 enables the view instantiation engine 140 of computer system 1010 to communicate over network 190 and, if necessary, retrieve data required to create views according to embodiments herein.

As shown, memory system 1012 is encoded with view instantiation engine application 140-1 that supports functionality as discussed above and as discussed further below. View instantiation engine application 140-1 (and/or other resources as described herein) can be embodied as software code such as data and/or logic instructions (e.g., code stored on a tangible computer readable medium such as memory or on another computer readable medium such as a disk) that supports processing functionality according to different embodiments described herein. During operation of one embodiment, processor 1013 accesses memory system 1012 via the use of interconnect 1011 in order to launch, run, execute, interpret or otherwise perform the logic instructions of the view instantiation engine application 140-1. Execution of the view instantiation engine application 140-1 produces processing functionality in view instantiation engine process 140-2. In other words, the view instantiation engine process 140-2 represents one or more portions of the view instantiation engine application 140-1 performing within or upon the processor 1013 in the computer system 1010.

It should be noted that, in addition to the view instantiation engine process 140-2 that carries out method operations as discussed herein, other embodiments herein include the view instantiation engine application 140-1 itself (i.e., the un-executed or non-performing logic instructions and/or data). The view instantiation engine application 140-1 may be stored on a computer readable medium (e.g., a repository) such as a floppy disk, hard disk or in an optical medium. According to other embodiments, the view instantiation engine application 140-1 can also be stored in a memory type system such as in firmware, read only memory (ROM), or, as in this example, as executable code within the memory system 1012 (e.g., within Random Access Memory or RAM).

In addition to these embodiments, it should also be noted that other embodiments herein include the execution of the view instantiation engine application 140-1 in processor 1013 as the resource analyzer process 140-2. Thus, those skilled in the art will understand that the computer system 1010 can include other processes and/or software and hardware components, such as an operating system that controls allocation and use of hardware resources.

In a manner as discussed above for the view instantiation engine 140, note that each of the editor application 110, compiler 120, and presentation engine 150 can include memory and a corresponding processor. Instructions for carrying the functions can be stored and memory and executed by a respective processor to carry out such functions.

Functionality supported by computer system 1010 and, more particularly, functionality associated with view instantiation engine 140 will now be discussed via flowcharts in FIGS. 10 through 14. For purposes of the following discussion, the resource analyzer 140 (e.g., resource analyzer application 140-1 and/or resource analyzer process 140-2) or other appropriate entity generally performs steps in the flowcharts.

Note that there will be some overlap with respect to concepts discussed above for FIGS. 1 through 8. Also, note that the steps in the below flowcharts need not always be executed in the order shown.

Figure 11:
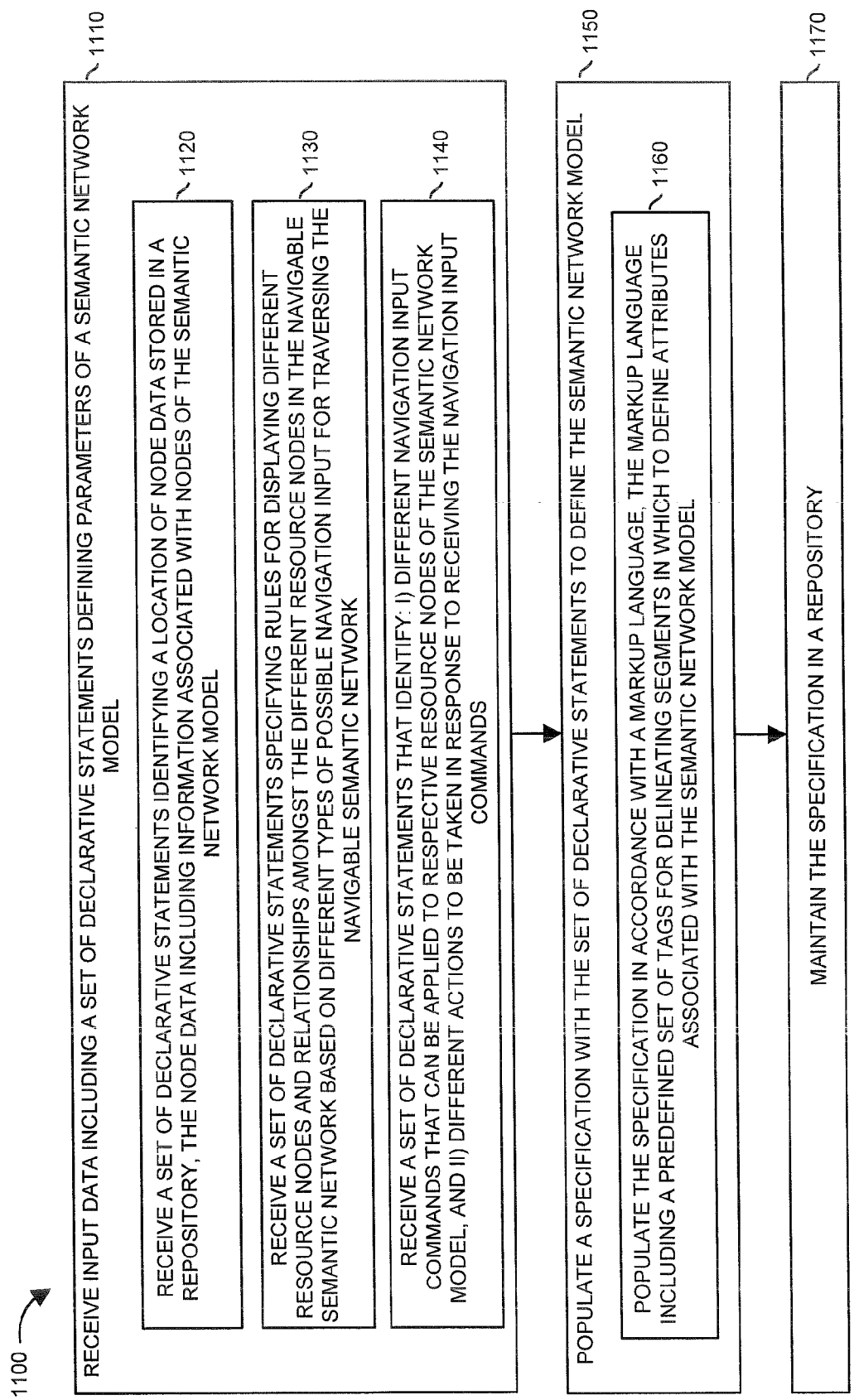
FIG. 11 is a flowchart illustrating an example method for generating a specification associated with a semantic network according to embodiments herein.

FIG. 11 is an example flowchart 1100 illustrating a operations associated with editor application 110 according to embodiments herein. Note that flowchart 1100 of FIG. 11 and corresponding text below may overlap with and refer to some of the matter previously discussed with respect to FIGS. 1-10.

In step 1110, the editor application 110 receives input data including a set of declarative statements defining parameters of a semantic network model 125.

In sub-step 1120, the editor application 110 receives a set of declarative statements identifying locations where node information associated with each of the multiple nodes (of the semantic network model 125) is stored in repository 180.

In sub-step 1130, the editor application 110 receives a set of declarative statements specifying rules and relationship information. The rules indicate how to display different resource nodes in the semantic network. The relationship information specifies different relationships amongst the different resource nodes in the navigable semantic network.

In sub-step 1140, the editor application 110 receives a set of declarative statements that identify: i) different navigation input commands that can be applied to respective resource nodes of the semantic network model, and ii) different actions to be taken in response to receiving the navigation input commands.

In step 1150, the editor application 110 populates a specification 115 with the set of declarative statements to define the semantic network model 125.

In sub-step 1160, the editor application 110 populates the specification 115 in accordance with a markup language. The markup language can include a predefined set of tags for delineating segments in which to define attributes associated with the semantic network model.

In step 1170, the editor application 110 maintains the specification 115 in repository 180.

Figure 12:
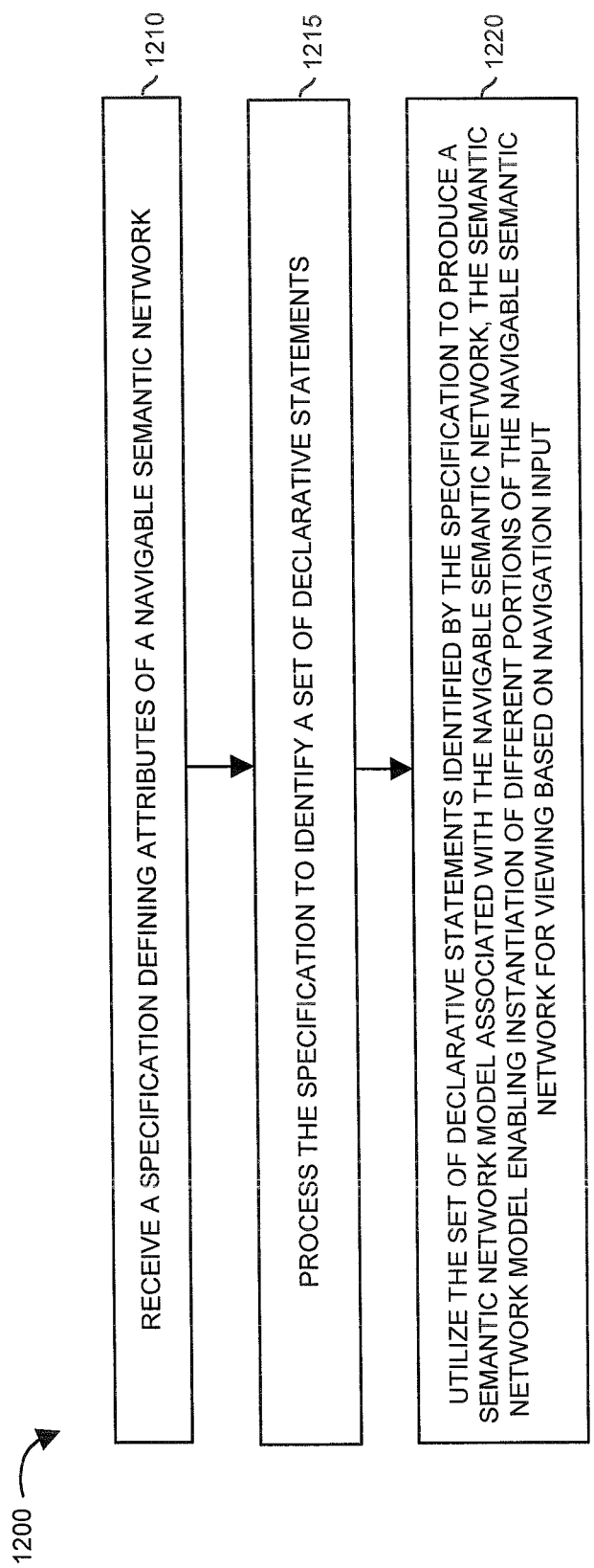
FIG. 12 is a flowchart illustrating an example method for compiling a specification to produce a semantic network model according to embodiments herein.

FIG. 12 is an example flowchart 1200 illustrating a operations associated with compiler application 120 according to embodiments herein. Note that flowchart 1200 of FIG. 12 and corresponding text below may overlap with and refer to some of the matter previously discussed with respect to FIGS. 1-10.

In step 1210, the compiler 120 receives a specification 115 defining attributes of a navigable semantic network.

In step 1215, the compiler 120 processes the specification 115 to identify a set of declarative statements.

In step 1220, the compiler 120 utilizes the set of declarative statements identified by the specification 115 to produce a semantic network model 125 associated with the navigable semantic network. The semantic network model 125 enables instantiation of different portions of the navigable semantic network for viewing based on navigation input.

Figure 13:
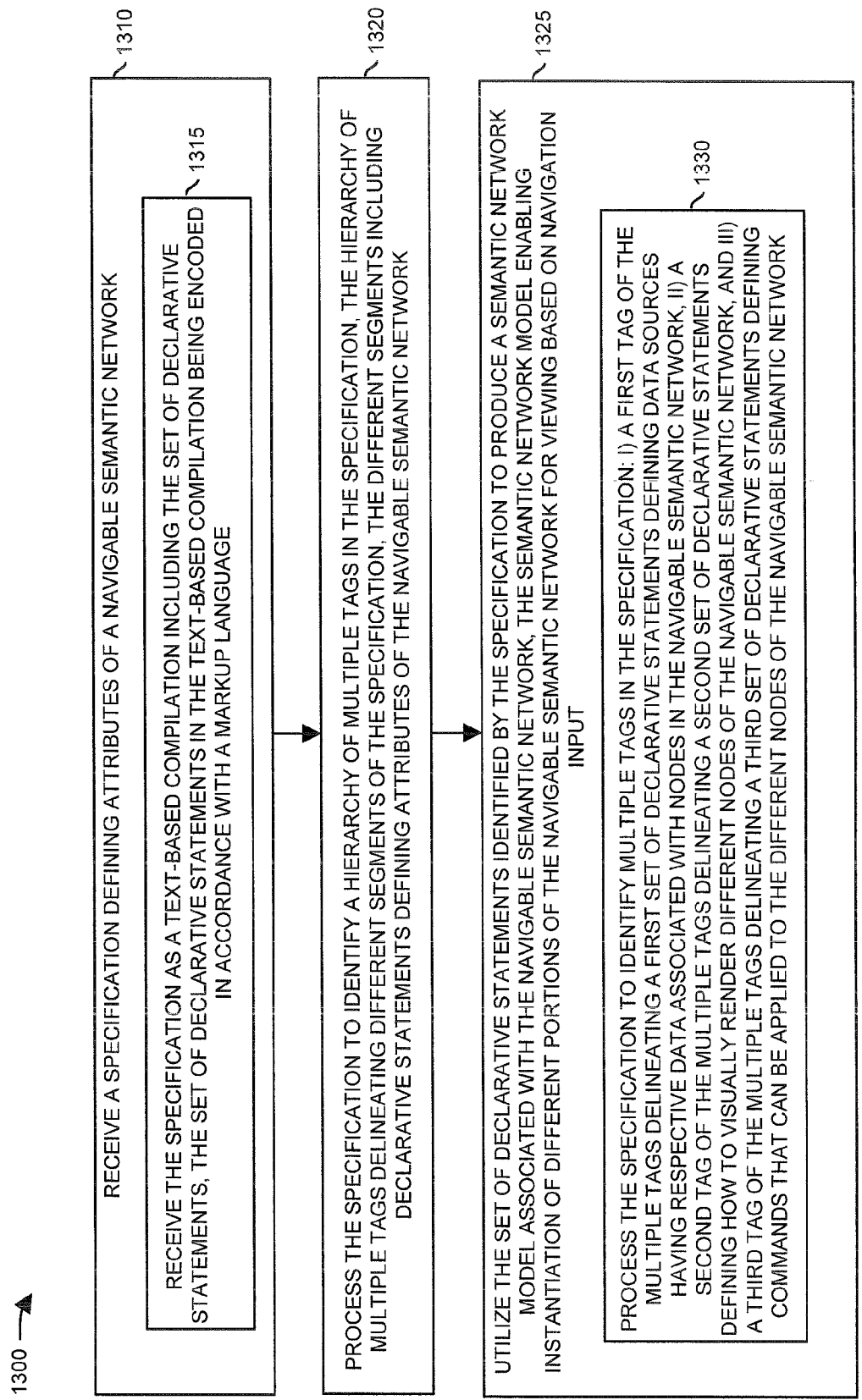
FIG. 13 is a flowchart illustrating an example method for compiling a specification to produce a semantic network model according to embodiments herein.

FIG. 13 is an example flowchart 1300 illustrating operations associated with compiler 120 according to embodiments herein. Note that flowchart 1300 of FIG. 13 and corresponding text below may overlap with and refer to some of the matter previously discussed.

In step 1310, the compiler 120 receives a specification 115 defining attributes of a navigable semantic network.

In sub-step 1315, the compiler 120 receives the specification 115 as a text-based compilation (e.g., document, file, listing, etc.) including the set of declarative statements. The set of declarative statements in the text-based compilation can be encoded in accordance with a markup language.

In step 1320, the compiler 120 processes the specification 115 to identify a hierarchy of multiple tags in the specification 115. The hierarchy of multiple tags delineates different segments of the specification 115. The different segments can of the specification 115 can include declarative statements defining attributes of the navigable semantic network.

In step 1325, the compiler 120 utilizes the set of declarative statements identified by the specification 115 to produce a semantic network model 125 associated with the navigable semantic network. The semantic network model 125 enables instantiation of different portions of the navigable semantic network for viewing based on navigation input.

In step 1330, the compiler 120 processes the specification 115 to identify multiple tags in the specification 115: i) a first tag of the multiple tags delineates a first set of declarative statements defining data sources having respective data associated with nodes in the navigable semantic network model 125, ii) a second tag of the multiple tags delineates a second set of declarative statements defining how to visually render different nodes of the navigable semantic network model 125, and iii) a third tag of the multiple tags delineates a third set of declarative statements defining commands that can be applied to the different nodes of the navigable semantic network model 125.

Figure 14:
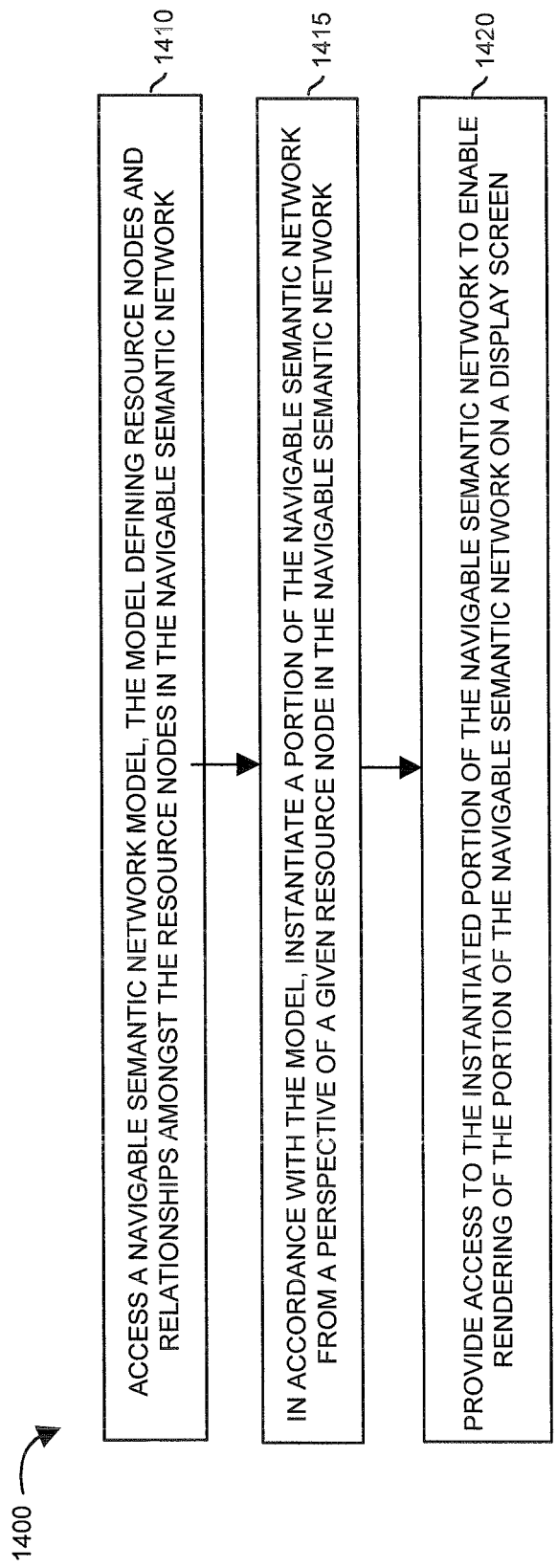
FIG. 14 is a flowchart illustrating an example method for instantiating a view associated with a semantic network according to embodiments herein.

FIG. 14 is an example flowchart 1400 illustrating operations associated with view instantiation engine 140 according to embodiments herein. Note that flowchart 1400 of FIG. 14 and corresponding text below may overlap with and refer to some of the matter previously discussed.

In step 1410, the view instantiation engine 140 accesses the navigable semantic network model 125. The semantic network model 125 defines resource nodes and relationships amongst the resource nodes in the navigable semantic network.

In step 1415, in accordance with the model, the view instantiation engine 140 instantiates a portion (e.g., view rendering) of the navigable semantic network from a perspective of a given resource node in the navigable semantic network.

In step 1420, the view instantiation engine 140 provides access to the instantiated portion of the navigable semantic network 145 to enable rendering of a respective view of the navigable semantic network on a display screen 130.

Figure 15:
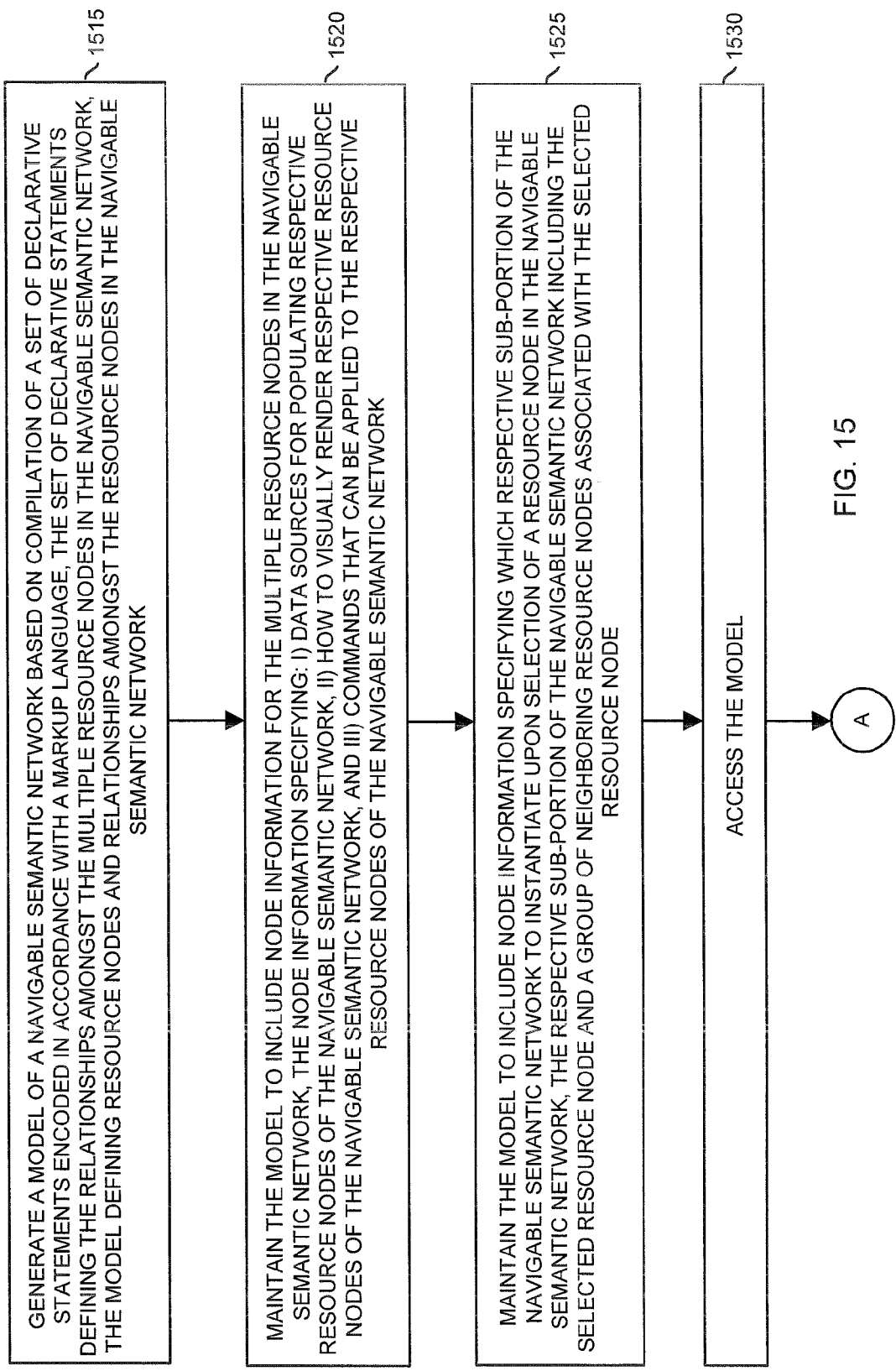

FIGS. 15 and 16 combine to form a flowchart 1500 (e.g., flowchart 1500-1 and flowchart 1500-2) illustrating a technique supporting metadata generation according to embodiments herein. Note that flowchart 1500-1 and 1500-2 and corresponding text below will make reference to and may overlap with matter previously discussed.

In step 1515, the compiler 120 generates a model 125 of a navigable semantic network based on compilation (e.g., specification 115) of a set of declarative statements encoded in accordance with a markup language. The set of declarative statements define the relationships amongst the multiple resource nodes in the navigable semantic network. The model 125 defines resource nodes and relationships amongst the resource nodes in the navigable semantic network.

In step 1520, the compiler 120 creates the model 125 to include node information for the multiple resource nodes in the navigable semantic network. The node information specifies: i) data sources for populating respective resource nodes of the navigable semantic network, ii) how to visually render respective resource nodes of the navigable semantic network, and iii) commands that can be applied to the respective resource nodes of the navigable semantic network.

In step 1525, the compiler 120 maintains the model to include node information specifying which respective subportion of the navigable semantic network to instantiate upon selection of a resource node in the navigable semantic network. The respective sub-portion of the navigable semantic network including the selected resource node and a group of neighboring resource nodes associated with the selected resource node.

In step 1530, the view instantiation engine 140 accesses the semantic network model 125.

In step 1610 of FIG. 16, in accordance with the model 125, the view instantiation engine 140 instantiates a portion of the navigable semantic network from a perspective of a given resource node in the navigable semantic network.

In step 1615, the view instantiation engine 140 provides access to the instantiated portion of the navigable semantic network to enable rendering of the portion of the navigable semantic network on a display screen.

In step 1620, the view instantiation engine 140 initiates display of the instantiated portion of the navigable semantic network on the display screen 130. The instantiated portion of the navigable semantic network on the display screen 130 includes the given resource node displayed as a focal node and a set of resource nodes displayed around the given resource node. In one embodiment, the semantic network model represents a social network.

In step 1625, in response to receiving selection of a particular node (e.g., a node other than the given resource node in the instantiated portion of the navigable semantic network), the view instantiation engine 140 updates the instantiated portion of the navigable semantic network to include the particular node as a new focal node instead of the given resource node being the focal node.

Note again that techniques herein are well suited for defining attributes of a semantic network, generation of a model associated with a semantic network, instantiation of different views associated with the semantic network, and presentation of the semantic network as described herein. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
   receiving a specification, the specification defining attributes of a navigable semantic network, the attributes identifying multiple resource nodes and corresponding relationships amongst the resource nodes;
   processing the specification to identify a set of declarative statements; and
   utilizing the set of declarative statements identified by the specification to produce a semantic network model associated with the navigable semantic network, the semantic network model enabling instantiation of different portions of the navigable semantic network for viewing based on navigation input.

2. The method as in claim 1, wherein the specification is a text based compilation comprising the set of declarative statements, the set of declarative statements in the text-based compilation being encoded in accordance with a markup language.

3. The method as in claim 1, wherein utilizing the set of declarative statements identified in the specification to produce the semantic network model further comprises:
processing the declarative statements to identify locations of node data stored in a repository, the node data associated with displayable resource nodes in the navigable semantic network.

4. The method as in claim 1, wherein utilizing the set of declarative statements identified in the specification to produce the semantic network model further comprises:
processing the declarative statements to identify rules for displaying different resource nodes and relationships amongst the different resource nodes in the navigable semantic network based on different types of possible navigation input for traversing the navigable semantic network.

5. The method as in claim 1, wherein utilizing the set of declarative statements identified in the specification to produce the semantic network model further comprises:
processing the declarative statements to identify: i) different possible navigation input commands that can be applied to respective resource nodes of the navigable semantic network, and ii) different actions to be taken by a display function to display portions of the navigable semantic network in response to receiving the different possible navigation input commands.

6. The method as in claim 1, wherein utilizing the set of declarative statements identified in the specification to produce the semantic network model includes compiling the specification to produce an executable semantic network model.

7. The method as in claim 1, wherein processing the specification to identify the set of declarative statements includes:
processing the specification to identify a hierarchy of multiple tags in the specification, the hierarchy of multiple tags delineating different segments of the specification, the different segments defining attributes of the navigable semantic network.

8. The method as in claim 1, wherein processing the specification to identify the set of declarative statements includes:
processing the specification to identify multiple tags in the specification: i) a first tag of the multiple tags delineating a first set of declarative statements defining data sources having respective data associated with nodes in the navigable semantic network, ii) a second tag of the multiple tags delineating a second set of declarative statements defining how to visually render different nodes of the navigable semantic network, and iii) a third tag of the multiple tags delineating a third set of declarative statements defining commands that can be applied to the different nodes of the navigable semantic network.

9. A method comprising:
receiving, in a specification, input data including a set of declarative statements defining parameters of a semantic network model, the input data identifying multiple resource nodes and corresponding relationships amongst the resource nodes;
populating the specification with the set of declarative statements to define the semantic network model; and
maintaining the specification in a repository.

10. The method as in claim 9, wherein populating the specification with the set of declarative statements to define the semantic network model includes:
populating the specification in accordance with a markup language, the markup language including a predefined set of tags for delineating segments in which to define attributes associated with the semantic network model.

11. The method as in claim 9, wherein receiving the input data includes receiving a set of declarative statements identifying a location of node data stored in a repository, the node data including label information associated with nodes of the semantic network model.

12. The method as in claim 9, wherein receiving the input data includes receiving a set of declarative statements that identify: i) different navigation input commands that can be applied to respective resource nodes of the semantic network model, and ii) different actions to be taken in response to receiving the navigation input commands.

13. The method as in claim 9, wherein populating the specification with the set of declarative statements includes:
generating the specification to include a hierarchy of multiple tags delineating different segments of the specification, the different segments defining attributes of the semantic network model: i) a first tag of the multiple tags delineating a first set of declarative statements defining data sources for populating nodes associated with the semantic network model, ii) a second tag of the multiple tags delineating a second set of declarative statements defining how to visually render different nodes of the semantic network model, and iii) a third tag of the multiple tags delineating a third set of declarative statements defining commands that can be applied to the different nodes of the semantic network model.

14. A method comprising:
accessing a specification identifying a model of a navigable semantic network, the model defining resource nodes and relationships amongst the resource nodes in the navigable semantic network;
in accordance with the model, instantiating a portion of the navigable semantic network from a perspective of a given resource node in the navigable semantic network; and
providing access to the instantiated portion of the navigable semantic network to enable rendering of the portion of the navigable semantic network on a display screen.

15. The method as in claim 14 further comprising:
maintaining the model to include node information for the multiple resource nodes in the navigable semantic network, the node information specifying: i) data sources for populating respective resource nodes of the navigable semantic network, ii) how to visually render respective resource nodes of the navigable semantic network, and iii) commands that can be applied to the respective resource nodes of the navigable semantic network.

16. The method as in claim 15 further comprising:
maintaining the model to include node information specifying which respective sub-portion of the navigable semantic network to instantiate upon selection of a resource node in the navigable semantic network, the respective sub-portion of the navigable semantic network including the selected resource node and a group of neighboring resource nodes associated with the selected resource node.

17. The method as in claim 14 further comprising:
initiating display of the instantiated portion of the navigable semantic network on the display screen as a social network, the instantiated portion of the navigable semantic network on the display screen including the given resource node displayed as a focal node and a set of resource nodes displayed around the given resource node.

18. The method as in claim 14, wherein accessing the model includes: i) identifying, in the semantic network model, resource node information associated with the given resource node, and ii) based on the resource node information, identifying a group of neighboring resource nodes related to the given resource node, iii) identifying resource node information associated with the group of neighboring resource nodes; and
wherein instantiating the portion of the navigable semantic network from the perspective of the given resource node in the navigable semantic network includes generating the instantiated portion of the navigable semantic network in accordance with i) the resource node information associated with the given resource node, and ii) the resource node information associated with the group of neighboring resource nodes.

19. The method as in claim 18, wherein generating the instantiated portion of the navigable semantic network includes:
utilizing the resource node information associated with the given resource node to identify: i) how to label the given resource node with text information when displayed on the display screen, and ii) the group of neighboring resource nodes associated with the given resource that are to be included in the instantiated portion of the navigable semantic network; and
utilizing the resource node information associated with the group of neighboring nodes to identify how to label the group of neighboring nodes when displayed on the display screen in relation to the given resource node.

20. The method as in claim 14 further comprising:
in response to receiving selection of a particular node other than the given resource node in the instantiated portion of the navigable semantic network, updating the instantiated portion of the navigable semantic network to include the particular node as a new focal node instead of the given resource node being the focal node.

21. A computer readable medium having computer code thereon, the medium comprising:
instructions for receiving a specification defining attributes of a navigable semantic network, the attributes identifying multiple resource nodes and corresponding relationships amongst the resource nodes;
instructions for processing the specification to identify a set of declarative statements; and
instructions for utilizing the set of declarative statements identified by the specification to produce a semantic network model associated with the navigable semantic network, the semantic network model enabling instantiation of different portions of the navigable semantic network for viewing based on navigation input.

22. The computer readable medium as in claim 21, wherein the instructions for utilizing the set of declarative statements identified in the specification to produce the semantic network model includes:
instructions for processing the declarative statements to identify locations of node data stored in a repository, the node data associated with displayable resource nodes in the navigable semantic network.

23. The computer readable medium as in claim 21, wherein the instructions for utilizing the set of declarative statements identified in the specification to produce the semantic network model includes:
instructions for processing the declarative statements to identify rules for displaying different resource nodes and relationships amongst the different resource nodes in the navigable semantic network based on different types of possible navigation input for traversing the navigable semantic network.

24. The computer readable medium as in claim 21, wherein the instructions for utilizing the set of declarative statements identified in the specification to produce the semantic network model includes:
instructions for processing the declarative statements to identify: i) different possible navigation input commands that can be applied to respective resource nodes of the navigable semantic network, and ii) different actions to be taken by a display function to display portions of the navigable semantic network in response to receiving the different possible navigation input commands.

25. The computer readable medium as in claim 21, wherein the instructions for processing the specification to identify the set of declarative statements includes:
instructions for processing the specification to identify a hierarchy of multiple tags in the specification, the hierarchy of multiple tags delineating different segments of the specification, the different segments defining attributes of the navigable semantic network.

26. A computer system comprising:
a processor;
a memory unit that stores instructions associated with an application executed by the processor; and
an interconnect coupling the processor and the memory unit, enabling the computer system to execute the application and perform operations of:
receiving a specification defining attributes of a navigable semantic network, the attributes identifying multiple resource nodes and corresponding relationships amongst the resource nodes;
processing the specification to identify a set of declarative statements; and
utilizing the set of declarative statements identified by the specification to produce a semantic network model associated with the navigable semantic network, the semantic network model enabling instantiation of different portions of the navigable semantic network for viewing based on navigation input.

27. The method of claim 1 further comprising identifying which of the resource nodes in the semantic network are directly related to a particular node of the resource nodes, and identifying which of the resource nodes are indirectly related to the particular node.

* * * * *